US010288013B2

(12) United States Patent
Dudar

(10) Patent No.: US 10,288,013 B2
(45) Date of Patent: May 14, 2019

(54) SYSTEMS AND METHODS FOR PREVENTING FUEL TANK OVERFILLING

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 169 days.

(21) Appl. No.: 15/095,634

(22) Filed: Apr. 11, 2016

(65) Prior Publication Data
US 2017/0292476 A1    Oct. 12, 2017

(51) Int. Cl.
*B67D 7/04* (2010.01)
*B67D 7/08* (2010.01)
*F02M 25/08* (2006.01)
*B60K 15/035* (2006.01)

(52) U.S. Cl.
CPC ..... *F02M 25/089* (2013.01); *B60K 15/03504* (2013.01); *B60K 15/03519* (2013.01); *B67D 7/04* (2013.01); *B67D 7/08* (2013.01); *B60K 2015/03514* (2013.01); *B60K 2015/03576* (2013.01); *B60K 2015/03585* (2013.01)

(58) Field of Classification Search
CPC .................................................... F02M 25/089
USPC ................................................ 141/5; 137/14
See application file for complete search history.

(56) References Cited

U.S. PATENT DOCUMENTS

| 5,297,529 | A | * | 3/1994 | Cook | ................. | F02M 25/0818 |
| | | | | | | 123/198 D |
| 5,483,942 | A | * | 1/1996 | Perry | ................. | F02M 25/0818 |
| | | | | | | 123/198 D |
| 5,507,326 | A | * | 4/1996 | Cadman | ................. | B67D 7/342 |
| | | | | | | 141/1 |

(Continued)

FOREIGN PATENT DOCUMENTS

WO    2010104379 A2    9/2010

OTHER PUBLICATIONS

Dudar, Aed M. et al., "Systems and Methods for Preventing Fuel Tank Overfilling," U.S. Appl. No. 14/976,699, filed Dec. 21, 2015, 70 pages.

(Continued)

*Primary Examiner* — Jason K Niesz
*Assistant Examiner* — James R Hakomaki
(74) *Attorney, Agent, or Firm* — Julia Voutyras; McCoy Russell LLP

(57) ABSTRACT

Methods and systems are provided for preventing fuel tank overfilling during refueling events, wherein overfilling of the fuel tank is prevented by delivering a pressure pulse to the fuel tank responsive to a fuel fill level reaching a predetermined threshold, or responsive to an attempt to add additional fuel subsequent to the fuel fill threshold being reached. In one example, an onboard pressure vessel is actively pressurized via an onboard pump, where the pressure may be actively released and routed to the fuel tank to induce an automatic shutoff of a refueling dispenser pump under predetermined conditions. In this way, automatic shutoffs of refueling dispenser pumps may be rapidly and reliably induced, thus preventing fuel tank overfilling, prolonging the lifetime of fuel vapor storage canisters, and reducing undesired evaporative emissions.

18 Claims, 8 Drawing Sheets

(56) References Cited

U.S. PATENT DOCUMENTS

| | | | | |
|---|---|---|---|---|
| 5,606,121 A * | 2/1997 | Blomquist | G01M 3/3236 | 73/114.39 |
| 5,651,350 A * | 7/1997 | Blomquist | F02M 25/0818 | 123/520 |
| 5,671,718 A * | 9/1997 | Curran | F02D 41/0045 | 123/357 |
| 5,781,100 A * | 7/1998 | Komatsu | H01C 10/306 | 338/160 |
| 5,979,481 A | 11/1999 | Ayresman | | |
| 6,016,827 A * | 1/2000 | Dawson | B60K 15/03519 | 137/202 |
| 6,073,487 A * | 6/2000 | Dawson | F02M 25/0809 | 73/114.39 |
| 6,145,532 A * | 11/2000 | Tuckey | B60K 15/03519 | 137/202 |
| 6,158,270 A * | 12/2000 | Garman | F02M 25/0809 | 123/520 |
| 6,199,574 B1 * | 3/2001 | Harris | B60K 15/035 | 137/199 |
| 6,260,544 B1 * | 7/2001 | Spry | B60K 15/03504 | 123/516 |
| 6,289,947 B1 * | 9/2001 | Heimbrodt | B60K 15/035 | 141/128 |
| 6,601,617 B2 | 8/2003 | Enge | | |
| 6,698,692 B1 | 3/2004 | Tichenor et al. | | |
| 6,722,189 B2 * | 4/2004 | Fabre | F02M 25/0809 | 73/114.38 |
| 7,233,845 B2 | 6/2007 | Veinotte | | |
| 7,296,600 B2 | 11/2007 | Ferreria et al. | | |
| 7,347,191 B2 | 3/2008 | Atwood et al. | | |
| 7,866,356 B2 | 1/2011 | Benjey | | |
| 7,878,214 B1 * | 2/2011 | Jansen | B64D 37/34 | 137/12 |
| 8,245,699 B2 * | 8/2012 | Peters | F02M 25/0872 | 123/518 |
| 8,671,916 B2 * | 3/2014 | Ogaki | B60K 15/00 | 123/516 |
| 9,441,579 B2 * | 9/2016 | Iwaya | F02M 25/0809 | |
| 2002/0162457 A1 * | 11/2002 | Hyodo | F02M 25/089 | 96/109 |
| 2005/0279406 A1 * | 12/2005 | Atwood | B60K 15/035 | 137/39 |
| 2005/0284539 A1 * | 12/2005 | Leonhardt | F16K 24/044 | 141/302 |
| 2011/0265768 A1 * | 11/2011 | Kerns | F02M 25/08 | 123/521 |
| 2014/0257668 A1 * | 9/2014 | Jentz | F02M 25/0809 | 701/102 |
| 2014/0303830 A1 * | 10/2014 | Dudar | F02M 25/0809 | 701/29.1 |
| 2014/0311461 A1 * | 10/2014 | Dudar | F02M 25/0818 | 123/520 |
| 2014/0374177 A1 * | 12/2014 | Yang | B60K 15/035 | 180/65.21 |
| 2015/0075267 A1 * | 3/2015 | Sweppy | G01F 23/14 | 73/114.43 |
| 2015/0075501 A1 * | 3/2015 | Peters | F02M 25/0854 | 123/520 |
| 2015/0090006 A1 | 4/2015 | Peters et al. | | |
| 2015/0090232 A1 * | 4/2015 | Peters | F02M 25/0854 | 123/520 |
| 2015/0090233 A1 * | 4/2015 | Dudar | F02M 25/0854 | 123/520 |
| 2015/0090235 A1 * | 4/2015 | Pearce | F02M 25/0818 | 123/520 |
| 2015/0101704 A1 * | 4/2015 | Leone | B67D 7/0478 | 141/5 |
| 2015/0275790 A1 * | 10/2015 | Matsunaga | F02M 25/089 | 123/519 |
| 2016/0115907 A1 * | 4/2016 | Hagen | B60K 15/03519 | 137/544 |

OTHER PUBLICATIONS

Anonymous, "Vehicle Refuel Trickle Fill Effect Mitigation," IPCOM No. 000242830, Published Aug. 21, 2015, 2 pages.

* cited by examiner

SYSTEMS AND METHODS FOR PREVENTING FUEL TANK OVERFILLING

FIELD

The present description relates generally to methods and systems for controlling a vehicle fuel system to rapidly induce automatic shutoffs of a refueling dispenser to prevent fuel tank overfilling.

BACKGROUND/SUMMARY

Vehicles with an internal combustion engine may be fitted with fuel vapor recovery systems wherein vaporized hydrocarbons (HCs) released from a fuel tank are captured and stored in a fuel vapor canister containing a quantity of fuel-absorbing material such as activated charcoal. Eventually, the fuel vapor canister may become filled with an amount of fuel vapor. The fuel canister may be cleared of fuel vapor by way of a purging operation. A fuel vapor purging operation may include opening a purge valve to introduce the fuel vapor into the cylinder(s) of the internal combustion engine for combustion so that fuel economy may be maintained and fuel vapor emissions may be reduced.

Activated charcoal has been found to be a suitable fuel vapor absorbing material to be used in such a canister device because of its extremely porous structure and very large surface area to weight ratio. However, this porous structure can be blocked and lose its efficiency when coated with liquid fuel. This may occur if, for example, during refueling a pump operator adds fuel after an initial automatic shut-off. For instance, the maximum fill level for liquid fuel within a fuel tank is typically controlled by a mechanical shut-off valve that closes responsive to the level of liquid fuel in the tank. When this valve (frequently termed a fill limit vent valve) closes, pressure inside the tank increases thus causing liquid fuel to back up in a fill tube which actuates an automatic shut-off of a vehicle refueling pump nozzle, thus terminating the flow of fuel into the fuel tank. In an attempt to maximize the amount of fuel pumped into the tank, a pump operator may dispense additional fuel after an automatic shutoff, in what is commonly referred to as "trickle-filling". If, as a result of trickle-filling the fuel tank, liquid has entered the fuel vapor recovery lines and a purge cycle is commanded at the next engine start, the liquid can get sucked into the canister and corrupt the activated carbon. This may decrease the efficiency of the canister and lead to increased HC emissions. Additionally, if liquid fuel in the canister or purge line is purged to the intake, a reduction of engine power and increase in combustion emissions may result from an extremely low air-fuel ratio (A/F). Overfilling the fuel tank may also impact a distance to empty calculation, and may lead to increased levels of evaporative emissions as the fuel vapor canister may not be able to adsorb fuel vapors in excess of 100% fuel fill level during a refueling event.

As the fuel limit vent valve is a passive mechanical valve, the FLVV reaction time must be designed, validated, and tested properly which involves time and resources. For example, mechanical FLVVs are typically designed based on the shape and size of the fuel tank in which they will operate, and as such one mechanical FLVV may not be suitable for use in a different fuel tank. Additionally, the fill level in a fuel tank may vary from one refueling event to another when mechanical FLVVs are relied upon for shutting off refueling dispensers, as repeatability between refueling events may vary, and over time the FLVV may develop hysteresis, stiction, and may not function per design. Furthermore, mechanical FLVVs may not prevent extensive trickle-filling after an initial automatic shutoff. The inventors herein have recognized these issues.

Toward this end, U.S. Pat. No. 7,347,191B2 teaches an electrically operated vent valve (EOVV) configured such that in an open position fuel vapor may be vented from a fuel tank, and wherein in a closed position fluid flow is restricted. The EOVV may be actuated by a controller, responsive to a signal to close the EOVV when the fuel tank is full, or nearly so, thus terminating venting from the fuel tank. As such, since fuel vapor cannot be displaced from the fuel tank with the EOVV closed, pressure within the fuel tank may build resulting in the triggering of an automatic shutoff of a refueling dispenser. U.S. Pat. No. 7,347,191B2 further teaches that additional fuel (e.g., "rounding up" or "trickle-fill) may be permitted to be added to the fuel tank after a certain interval of time subsequent to an initial automatic shutoff event, by commanding the EOVV open, and subsequently closing the EOVV after a preprogrammed interval, for example. However, the inventors herein have recognized potential issues with such a method. For example, permitting additional fuel to be added subsequent to an initial autocratic shutoff, wherein control over the additional refueling relies on a subsequent pressure build induced by adding fuel to the fuel tank in order to repeatedly shut off the refueling dispenser, may in some cases result in liquid fuel entering the fuel vapor recovery lines. Furthermore, even if the EOVV were commanded closed and maintained closed to prevent any further addition of fuel to the fuel tank, maintaining the pressure in the tank above a threshold that may prevent any subsequent addition of fuel may be problematic without active control over the pressure in the fuel tank.

Thus, the inventors herein have developed systems and methods to at least partially address the above issues. In one example, a method is provided comprising, storing pressure in a vessel external to a fuel tank that supplies fuel to a vehicle engine; and selectively coupling the vessel to the fuel tank to pressurize the fuel tank to a predetermined pressure threshold responsive to an indication that a fuel level in the fuel tank has reached a predetermined fuel fill level during a refueling event.

As one example, the predetermined pressure threshold induces an automatic shutoff of a refueling dispenser, the refueling dispenser supplying fuel to the fuel tank during the refueling event. In this way, automatic shutoffs of refueling dispenser pumps may be rapidly and reliably induced, thus preventing fuel tank overfilling, prolonging the lifetime of fuel vapor storage canisters, and reducing undesired evaporative emissions.

The above advantages and other advantages, and features of the present description will be readily apparent from the following Detailed Description when taken alone or in connection with the accompanying drawings.

The inventors herein have recognized the above-identified issues and potential approaches, along with the corresponding advantages, if any.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
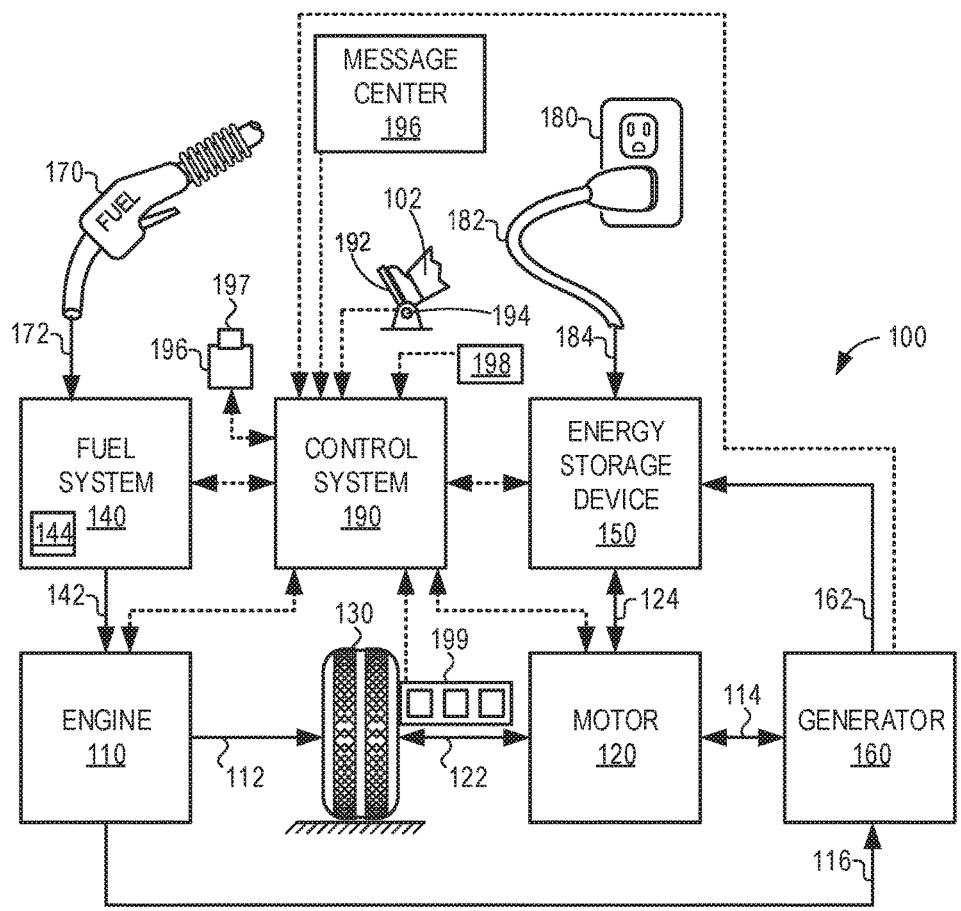
FIG. 1 schematically shows an example vehicle propulsion system.
Figure 2:
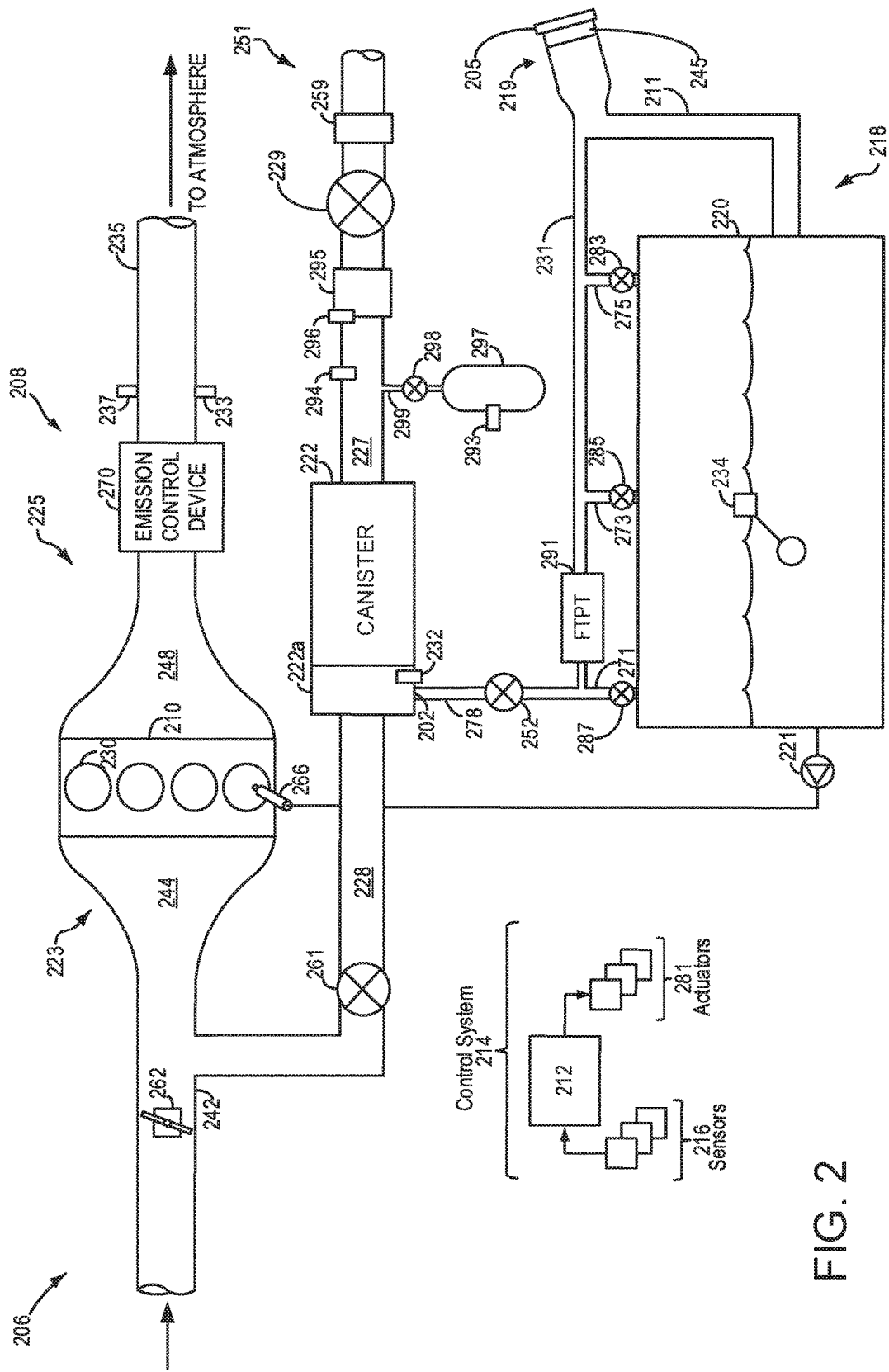
FIG. 2 schematically shows an example vehicle system comprising an engine system coupled to a fuel system and an evaporative emissions system.
Figure 5:
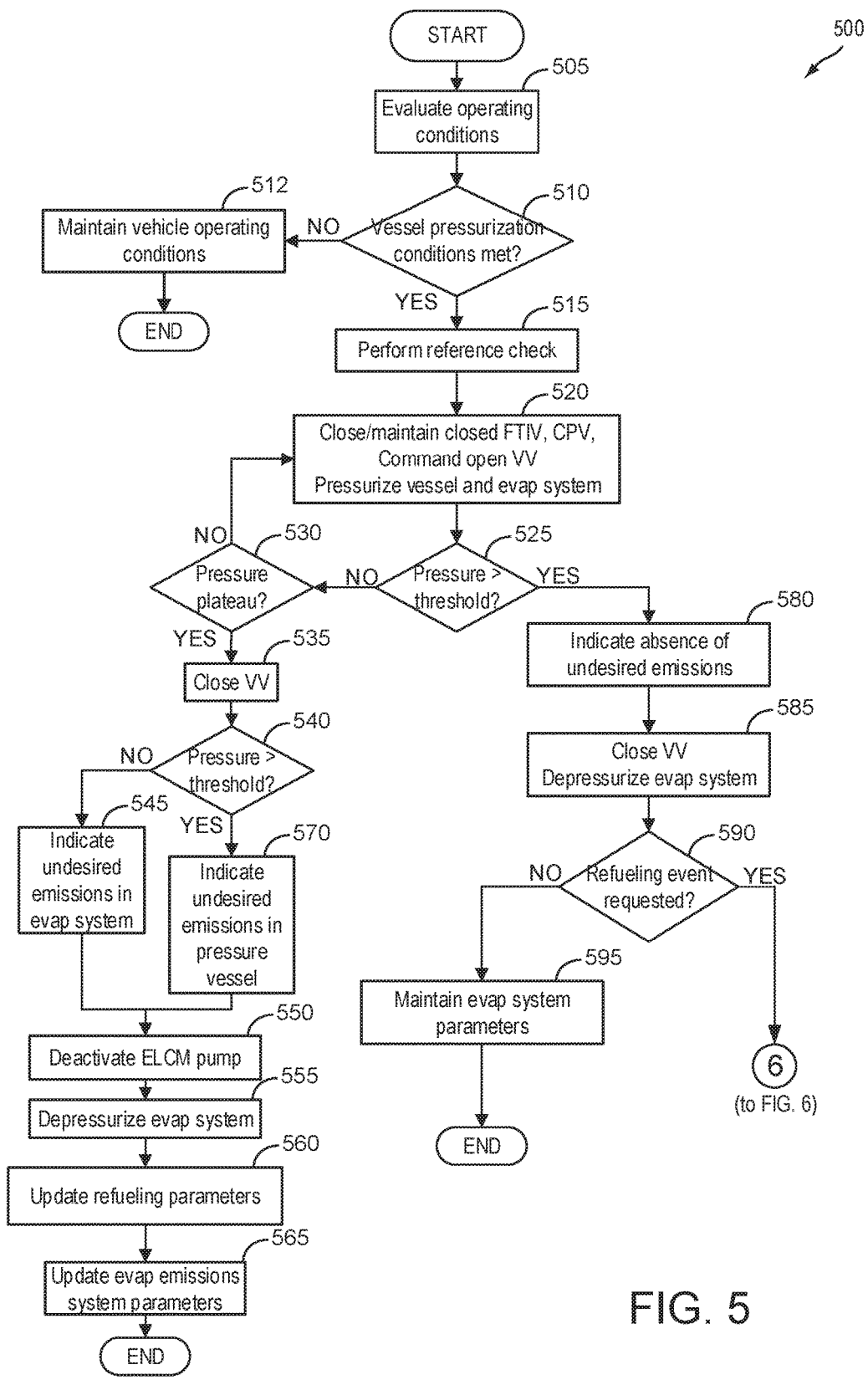
FIG. 5 shows an example method for storing pressure in an onboard vessel configured to pressurize a fuel tank during a refueling operation.
Figure 6:
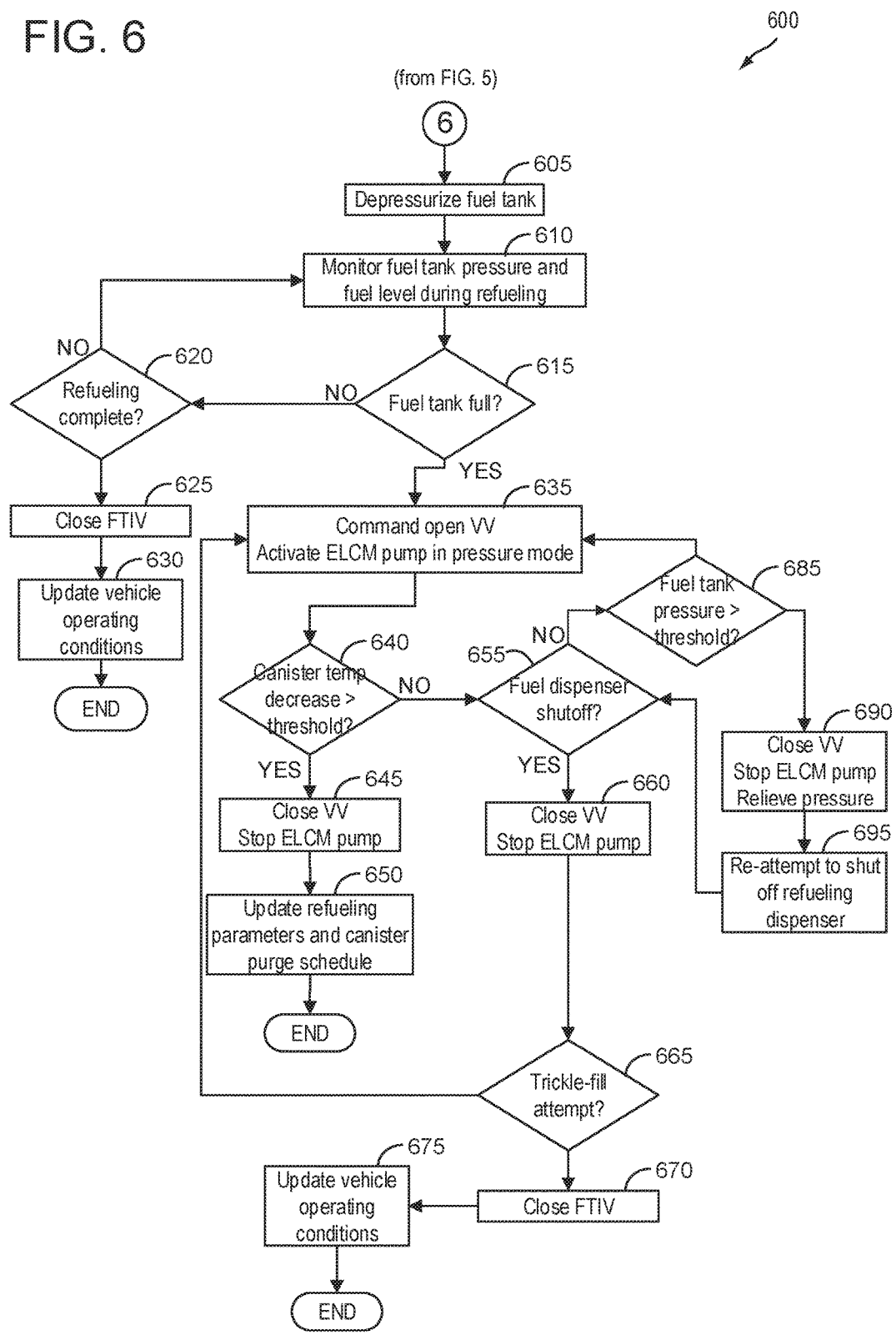
FIG. 6 shows an example method for pressurizing a fuel tank during a refueling operation in order to induce an automatic shutoff of a refueling dispenser.
Figure 7:
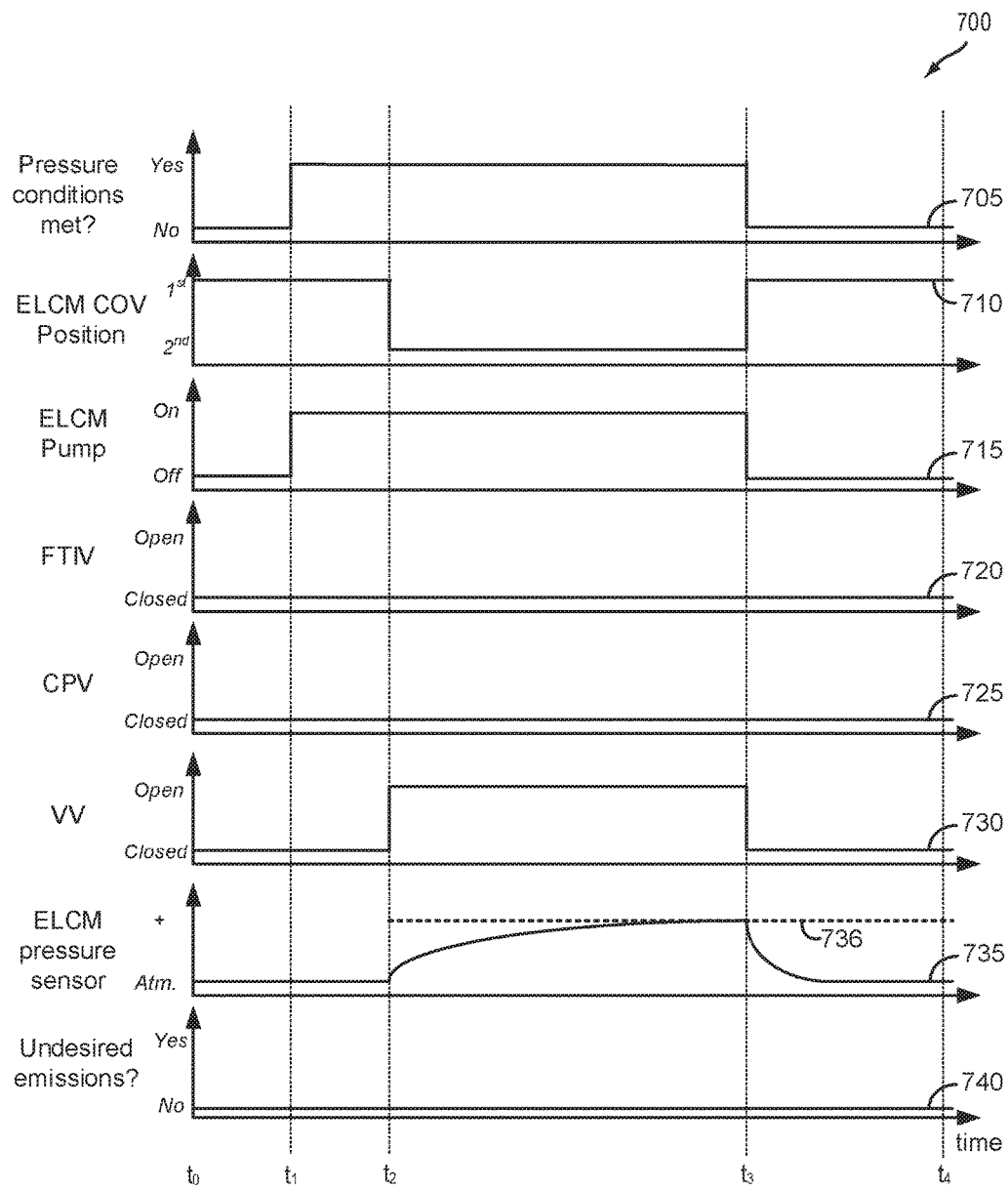
FIG. 7 shows an example timeline for pressurizing an onboard vessel according to the method depicted in FIG. 5.
Figure 8:
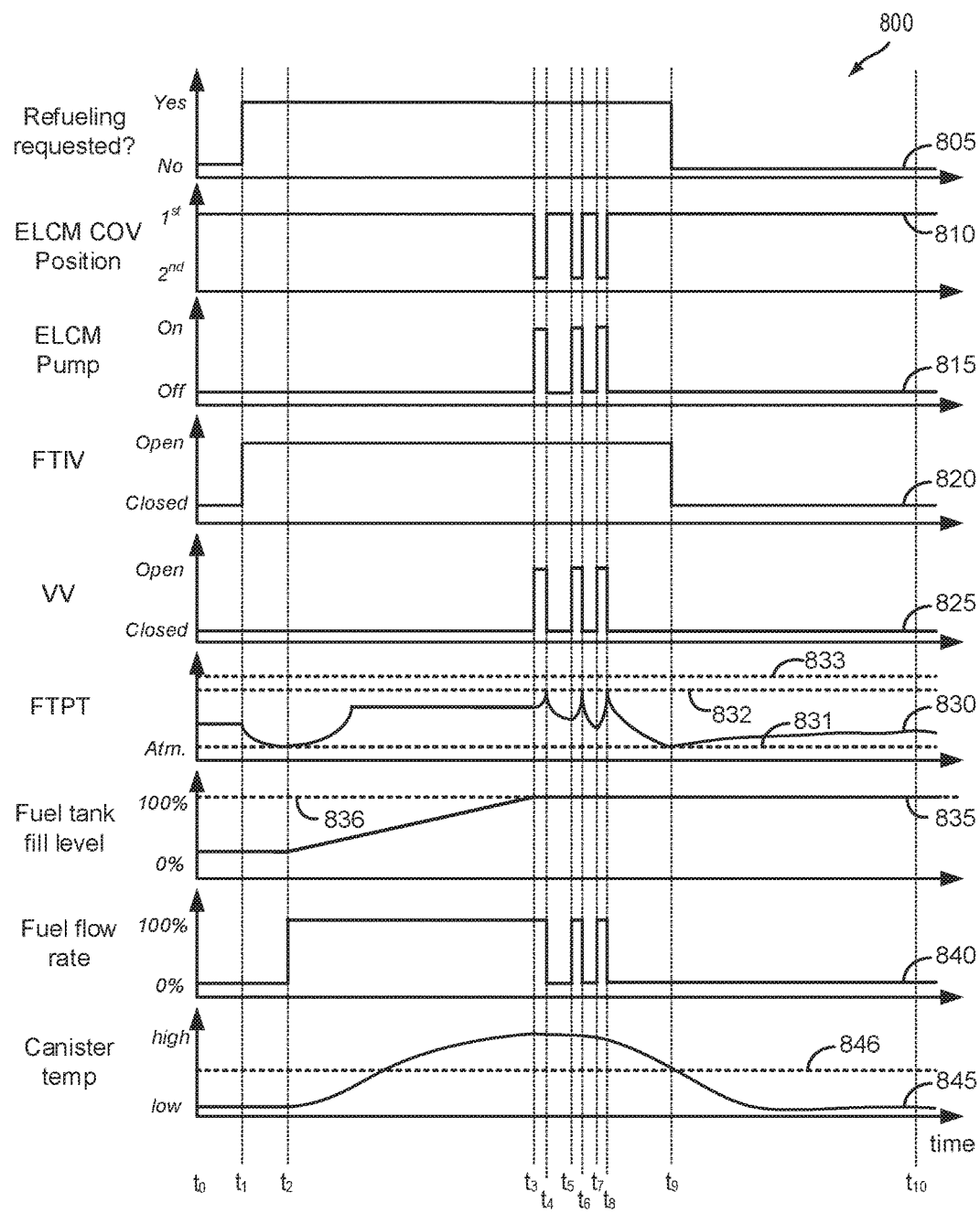
FIG. 8 shows an example timeline for pressurizing a fuel tank during a refueling operation according to the method depicted in FIG. 6.

The following detailed description relates to systems and methods for preventing fuel tank overfilling while refueling a fuel tank. The fuel tank may be included in a vehicle, such as a hybrid electric vehicle, as shown in FIG. 1. While a hybrid vehicle is depicted in FIG. 1, the example is not meant to be limiting, and the systems and methods depicted herein may apply to a non-hybrid vehicle without departing from the scope of the present disclosure. The vehicle may include a fuel system and an evaporative emissions (evap) control system, wherein the fuel tank is coupled to a fuel vapor canister via one or more fuel vapor recovery (evap recovery) lines as shown in FIG. 2. An onboard vessel positioned in the evaporative emissions system of the vehicle may be pressurized during vehicle operation in order to pressurize the fuel tank during a refueling event. In one example, overfilling the fuel tank (via trickle filling, or due to a faulty automatic shut-off mechanism) during refueling can lead to liquid fuel becoming trapped in the fuel vapor recovery lines. Liquid fuel in the evap recovery lines may be subsequently drawn into the fuel vapor canister, damaging the adsorbent there within. Preventing fuel tank overfilling may thus prevent liquid fuel from entering the evap recovery lines. Accordingly, pressurizing the onboard vessel may be accomplished via an onboard pump. For example, an evaporative level check module (ELCM) may be included in the evaporative emissions control system to pressurize the onboard vessel. Accordingly, the ELCM may be configured to adopt various conformations, such as the conformations shown in FIGS. 3A-3C. The direction of the onboard pump (ELCM) may be reversible by using an H-bridge circuit, such as the circuit shown in FIGS. 4A-4B, thus allowing the onboard pump to pressurize or evacuate the evap system. A method for pressurizing the evap system and onboard pressure vessel is depicted in FIG. 5. Once pressurized, the onboard vessel may be sealed to store pressure therein, and the stored pressure may be directed to the fuel tank during a subsequent refueling event. A method for conducting a refueling event wherein stored pressure from the onboard vessel is applied to the fuel tank responsive to fuel level in the fuel tank reaching a predetermined fuel fill level is depicted in FIG. 6. An example timeline for pressurizing an onboard vessel in the evap system of a vehicle according to the method illustrated in FIG. 5 is depicted in FIG. 7. An example timeline for applying pressure stored in the onboard vessel to the fuel tank during a refueling event to prevent fuel tank overfilling according to the method illustrated in FIG. 6 is depicted in FIG. 8.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor. Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits 278 and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves are provided in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283 The one or more vent valves may be electronically or mechanically actuated valves and may include active vent valves (that is, valves with moving parts that are actuated open or close by a controller) or passive valves (that is, valves with no moving parts that are actuated open or close passively based on a tank fill level). Based on a fuel level in the fuel tank 220, the vent valves may be open or closed. For example, GVV 287 may be normally open allowing for diurnal and "running loss" vapors from the fuel tank to be released into canister 222, preventing over-pressurizing of the fuel tank. However, during vehicle operation on an incline, when a fuel level as indicated by fuel level indicator 234 is artificially raised on one side of the fuel tank, GVV 287 may close to prevent liquid fuel from entering vapor recovery line 231. As another example, FLVV 285 may be normally open, however during fuel tank refilling, FLVV 285 may close, causing pressure to build in vapor recovery line 231 as well as at a filler nozzle coupled to the fuel pump. The increase in pressure at the filler nozzle may then trip the refueling pump, stopping the fuel fill process automatically, and preventing overfilling. However, in some examples, an FLVV may not be included, and instead an onboard pressure vessel 297 may be configured to direct pressure to the fuel tank during a refueling operation, in order to induce an automatic shutoff of a refueling dispenser, as will be described in further detail below. In still other examples, a FLVV may be included in a vehicle fuel tank, in addition to the fuel tank being pressurized via an onboard vessel during refueling operations. For example, the FLVV may be included as a backup mechanism configured to stop the flow of fuel to the fuel tank if certain conditions do not enable the use of active fuel tank pressurization, as described in further detail below.

Vapor recovery line 231 may be coupled to a refueling system 219. In some examples, refueling system 219 may include a fuel cap 205 for sealing off the fuel filler system from the atmosphere. Refueling system 219 is coupled to fuel tank 220 via a fuel filler pipe or neck 211. Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

Flow of air and vapors between canister 222 and the atmosphere may be regulated by a canister vent valve 229. Canister vent valve 229 may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere via canister vent valve 229, or purged to engine intake system 223 via canister purge valve 261. However, as described in more detail below, in a vehicle system configured with an evaporative level check monitor 295 (ELCM), canister vent valve 229 may not be included, and instead flow of air and vapors between canister 222 and atmosphere may be controlled by changing the position of a changeover valve (COV) in the ELCM. In still further examples, canister vent valve 229 may be included, in addition to ELCM 295.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 and canister vent valve 229 (or configure ELCM 295 in a first position as described in further detail below and with regard to FIG. 3C) while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252 and canister vent valve 229 (or configure ELCM 295 in a first position as described in further detail below and with regard to FIG. 3C), while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 and canister vent valve 229 (or configure ELCM 295 in a first position as described in further detail below and with regard to FIG. 3C) while closing isolation valve 252. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold. In still other examples, isolation valve 252 may be open during purging, to direct fuel tank vapors to the engine intake as well for combustion.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, fuel tank pressure sensor 291, fuel level sensor 234, vessel pressure sensor 293 (described below), and canister temperature sensor 232. Other sensors such as pressure, temperature, air/fuel ratio, and composition sensors may be coupled to various locations in the vehicle system 206. As another example, the actuators may include fuel injector 266, throttle 262, fuel tank isolation valve 252, vessel valve 298 (described below), ELCM 295, and refueling lock 245. The control system 214 may include a controller 212. The controller may receive input data from the various sensors, process the input data, and trigger the actuators in response to the processed input data based on instruction or code programmed therein corresponding to one or more routines. Example control routines are described herein with reference to FIGS. 5-6.

Evaporative emissions detection routines may be intermittently performed by controller 212 on fuel system 218 to confirm that the fuel system is not degraded. As such, evaporative emissions detection routines may be performed while the engine is off (engine-off evaporative emissions test) using engine-off natural vacuum (EONV) generated due to a change in temperature and pressure at the fuel tank following engine shutdown and/or with vacuum supplemented from a vacuum pump. Alternatively, evaporative emissions detection routines may be performed while the engine is running by operating an onboard pump and/or using engine intake manifold vacuum. Evaporative emissions tests may be performed by an evaporative level check monitor (ELCM) 295 communicatively coupled to controller 212. ELCM 295 may be coupled in vent 227, between canister 222 and the atmosphere. ELCM 295 may include a pump configured to apply a positive or negative pressure to the fuel system when in a first conformation, such as when administering an evaporative emissions test. ELCM 295 may further include a reference orifice and a pressure sensor 296. Following the applying of a positive or negative pressure to the fuel system, a change in pressure at the reference orifice (e.g., an absolute change or a rate of change) may be monitored and compared to a threshold. Based on the comparison, undesired evaporative emissions in the fuel system may be diagnosed. As indicated, the ELCM vacuum pump may be a reversible vacuum pump, and thus configured to apply a positive pressure to the fuel system when a bridging circuit is reversed placing the pump in a second conformation.

As discussed above, onboard pressure vessel 297 may be included in evaporative emissions system 251. Onboard pressure vessel 297 may be positioned between canister 222 and ELCM 295. A vessel conduit 299 may couple to vent line 227 at a junction between canister 222 and ELCM 295. The flow of air into and out of pressure vessel 297 may be controlled by vessel valve 298. In some examples, vessel valve (VV) may be a solenoid-actuated valve, and may be controlled by controller 212. As one example, vessel valve may be a normally-closed valve, which, upon actuation, may be commanded open.

ELCM 295 may in some examples be configured to apply positive pressure to evaporative emissions system 251 while maintaining FTIV 252 and CPV 261 closed. In such an example, vessel valve 298 may be commanded open to enable the flow of air into the pressure vessel 297. Pressurization of the pressure vessel 297 and evaporative emissions control system 251 may be continued until pressure reaches a predetermined pressure threshold, as indicated by an ELCM pressure sensor. In some examples, ELCM pressure sensor may be integral to the ELCM, such as pressure sensor 296, however in other examples another pressure sensor 294 may be included in vent line 227 for indicating pressure in evaporative emissions control system 251 and pressure vessel 297. In still other examples, a vessel pressure sensor 293 may be included in the pressure vessel in order to directly indicate pressure in the vessel under conditions where the vessel is sealed from vent line 227. Upon reaching the predetermined pressure threshold vessel valve 298 may be commanded closed to store pressure in pressure vessel 297, such that responsive to a refueling event where a fuel fill level reaches a fuel fill level threshold, the stored pressure may be directed to the fuel tank to induce an automatic shutoff of a refueling dispenser.

Figure 3A:
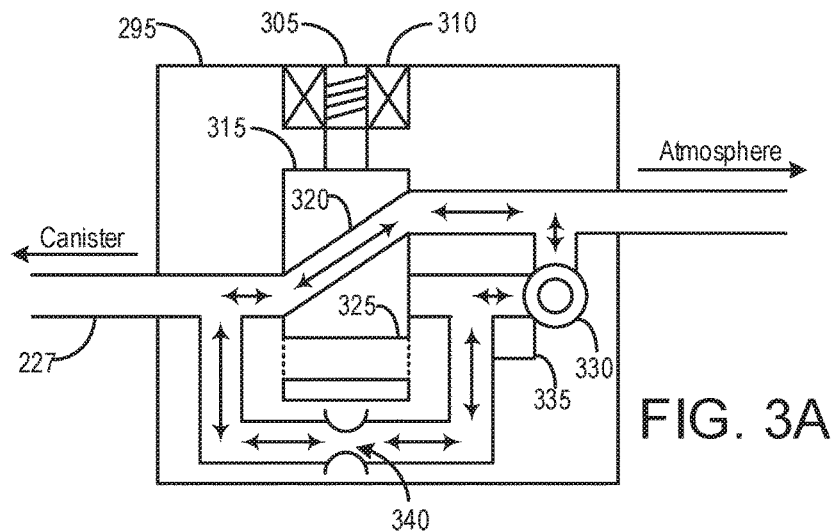
FIG. 3A shows a schematic depiction of an evaporative level check monitor in a configuration to perform a reference check.
Figure 3B:
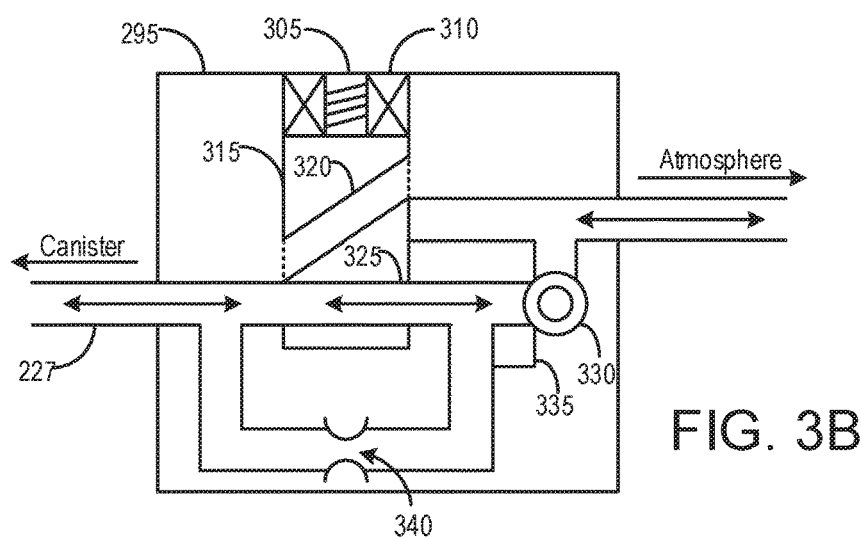
FIG. 3B shows a schematic depiction of an evaporative level check monitor in a configuration to that may enable evacuation or pressurization of a fuel system and evaporative emissions system.
Figure 3C:
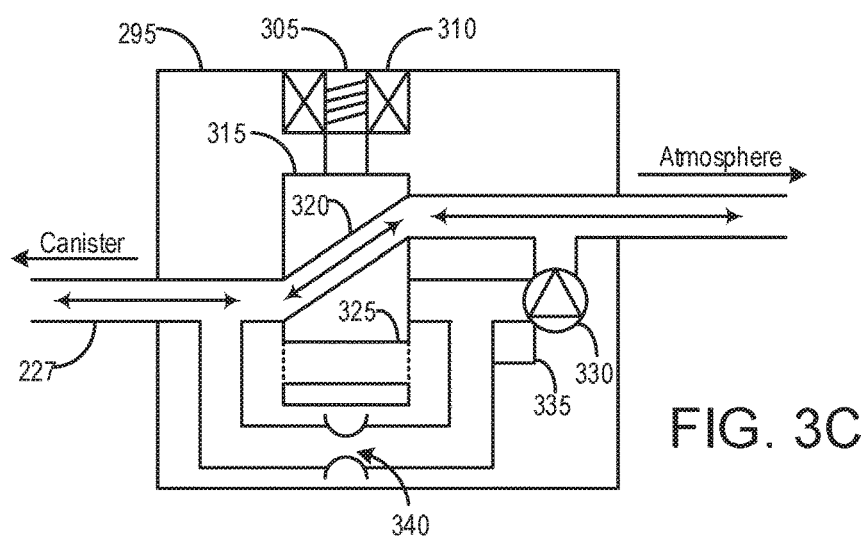
FIG. 3C shows a schematic depiction of an evaporative level check monitor in a configuration to perform a purge operation or to vent the fuel vapor canister to atmosphere.

FIGS. 3A-3C show a schematic depiction of an example ELCM 295 in various conditions in accordance with the present disclosure. As shown in FIG. 2, ELCM may be located along vent line 227 between canister 222 and atmosphere. ELCM 295 includes a changeover valve (COV) 315, a pump 330, and a pressure sensor 335. Pump 330 may be a vane pump, however other pump configurations have additionally been contemplated. The COV may be moveable between a first a second position. In the first position, as shown in FIGS. 3A and 3C, air may flow through the ELCM via first flow path 320. In the second position, as shown in FIG. 3B, air may flow through the ELCM via second flow path 325. The position of the COV may be controlled by solenoid 310 via compression spring 305. The ELCM may also comprise reference orifice 340. The reference orifice may have a diameter corresponding to the size of a threshold orifice size to be tested, for example, 0.02". In one example embodiment, the reference orifice has a diameter of 0.02", but may be smaller or greater in diameter in other embodiments. In either the first or second position, pressure sensor 335 may generate a pressure signal reflecting the pressure within the ELCM. Operation of the COV and solenoid may be controlled via signals received from controller 212.

As shown in FIG. 3A, the COV is in the first position, and the pump is activated. Air flow through the ELCM in this configuration is represented by arrows. In this configuration, the pump may draw a vacuum (or in some instances a positive pressure) on the reference orifice, and the pressure sensor may record the pressure level within the ELCM. This reference check pressure level reading may then become the threshold for passing a subsequent evaporative emissions test.

As shown in FIG. 3B, COV (e.g. 315) is in the second position, and pump (e.g., 330) is activated. Canister vent valve, when included (not shown), is open, allowing the pump to draw a vacuum or to apply positive pressure on evaporative emissions control system (e.g., 251), and in some examples fuel system (e.g., 218). In one example where the system includes a FTIV (e.g., 252), the FTIV and CPV (e.g., 261) may be commanded or maintained closed while the vessel valve (e.g., 298) may be commanded open and the ELCM may thus apply a positive pressure on the evaporative emissions system (e.g., 251) in order to pressurize an onboard storage vessel (e.g. 297). In other examples, the evaporative emissions system may be pressurized or evacuated without commanding open the vessel valve in order to conduct a test diagnostic for undesired evaporative emissions. In still other examples where the fuel system includes an FTIV, the FTIV may be opened to allow the pump (e.g., 330) to draw a vacuum on, or to pressurize, the fuel tank (e.g., 220) in order to conduct a test diagnostic for undesired evaporative emissions. Air flow through the ELCM in such potential conformations is represented by arrows.

As shown in FIG. 3C, COV (e.g., 315) is in the first position, and pump (e.g., 330) is deactivated. Canister vent valve, when included (not shown), is open, allowing for air to freely flow between atmosphere and the canister, such as during a canister purging operation wherein canister purge valve (e.g., 261) is open and intake manifold vacuum may draw air through the ELCM and fuel vapor canister (e.g., 222), thus resulting in the desorption of fuel vapors to engine intake for combustion. In another example, the COV may be configured in the first position with the pump deactivated and canister vent valve, when included, opened during a refueling event. If equipped, a FTIV (e.g., 252) may additionally be commanded open and refueling vapors may thus be routed from the fuel tank to the fuel vapor canister to be adsorbed, prior to exiting to atmosphere.

Figure 4A:
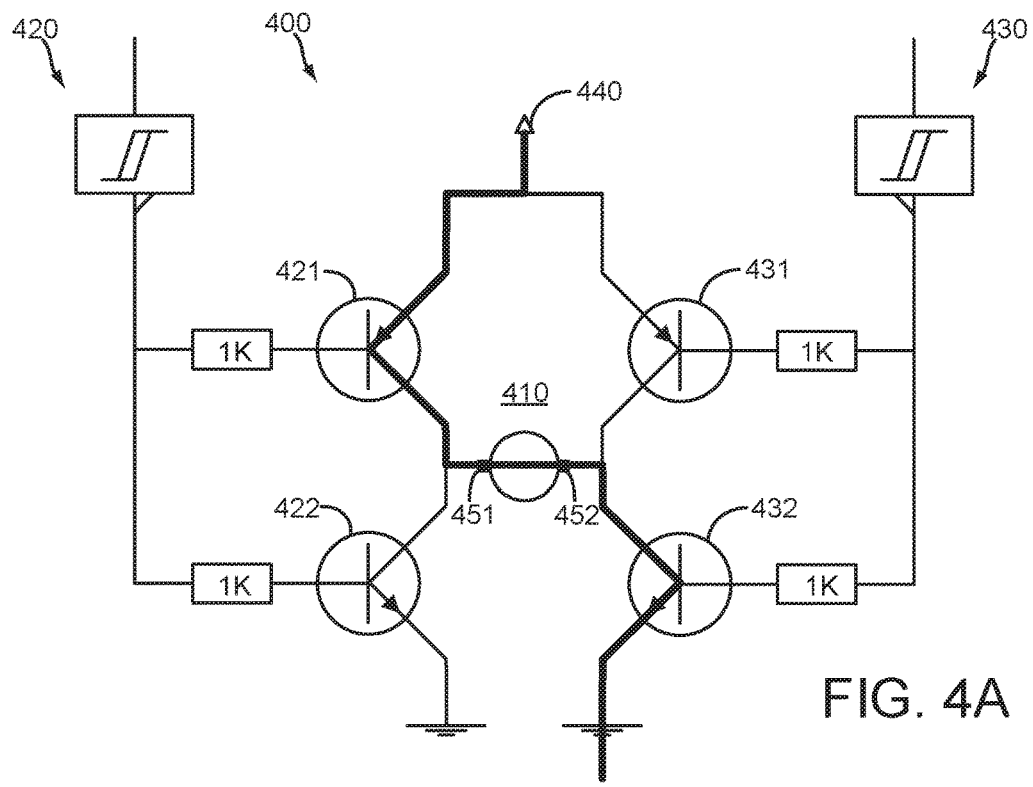
FIGS. 4A and 4B show a schematic depiction of an electronic circuit configured to reverse the direction of a motor of an onboard pump.
Figure 4B:
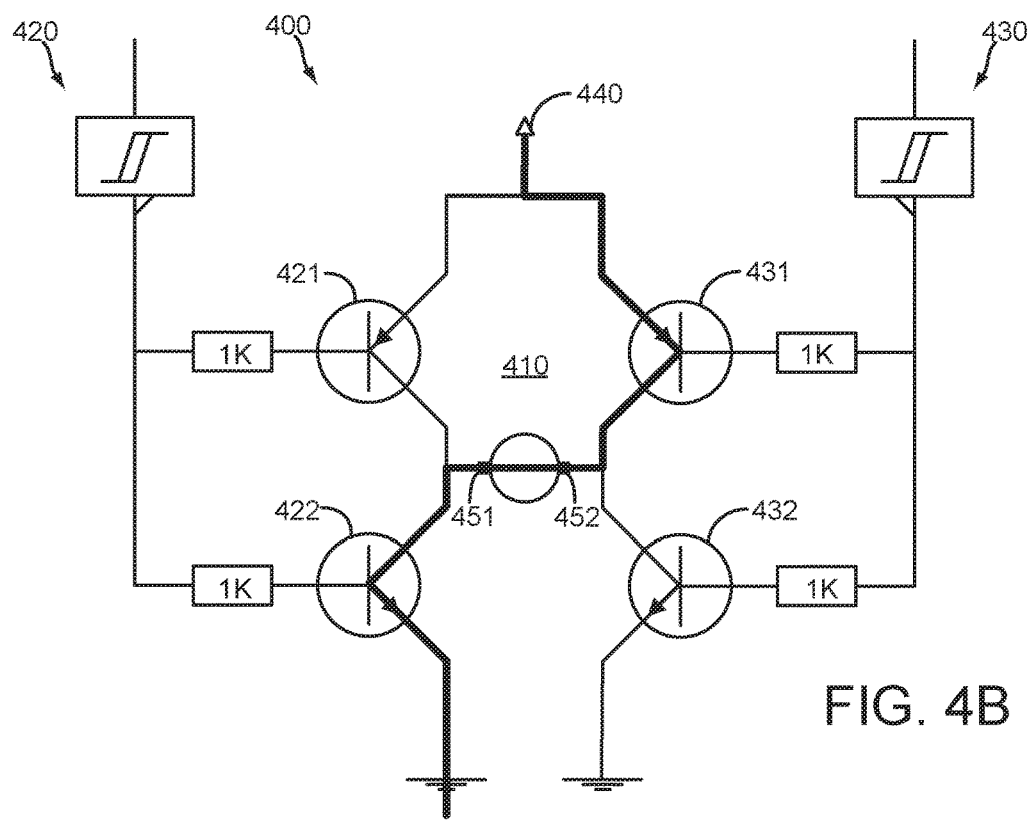

FIGS. 4A and 4B show an example circuit 400 that may be used for reversing direction of a pump (e.g., ELCM 295). Circuit 400 schematically depicts an H-Bridge circuit that may be used to run a motor 410 in a first direction and alternately in a second direction. Circuit 400 comprises a first (LO) side 420 and a second (HI) side 430. Side 420 includes transistors 421 and 422, while side 430 includes transistors 431 and 432. Circuit 400 further includes a power source 440.

In FIG. 4A, transistors 421 and 432 are energized, while transistors 422 and 431 are off. In this confirmation, the left lead 451 of motor 410 is connected to power source 440, and the right lead 452 of motor 410 is connected to ground. In this way, motor 400 may run in the first direction. When operating the pump via running circuit 400 in the first direction, positive pressure may be applied to the evaporative emissions system (e.g., 251), and under some circumstances the fuel system (e.g., 218) as well. In one example, applying positive pressure to the evaporative emissions system while commanding a vessel valve (e.g., 298) open may allow for pressurization of an onboard pressure vessel (e.g., 297), as described above with regard to FIG. 2.

In FIG. 4B, transistors 422 and 431 are energized, while transistors 421 and 432 are off. In this confirmation, the right lead 452 of motor 410 is connected to power source 440, and the left lead 451 of motor 410 is connected to ground. In this way, circuit 400 may run in the second direction. When operating the pump via running circuit 400 in the second direction, the evaporative emissions system (e.g., 251), and under some circumstances the fuel system (e.g., 218) as well, may be evacuated. In some examples, the fuel system and/or evaporative emissions system may be evacuated in order to conduct an evaporative emissions test diagnostic.

A flow chart for a high-level example method 500 for pressurizing an onboard pressure vessel is shown in FIG. 5. More specifically, method 500 may be used to pressurize the onboard pressure vessel, where the pressure may be stored until it is indicated that fuel level has reached a predetermined fuel fill level during a refueling event, at which point the pressure may be applied to the fuel tank to induce an automatic shutoff of a refueling dispenser pump. Method 500 will be described with reference to the systems described herein and shown in FIGS. 1-4B, though it should be understood that similar methods may be applied to other systems without departing from the scope of this disclosure. Method 500 may be carried out by a controller, such as controller 212 in FIG. 2, and may be stored at the controller as executable instructions in non-transitory memory. Instructions for carrying out method 500 and the rest of the methods included herein may be executed by the controller based on instructions stored on a memory of the controller and in conjunction with signals received from sensors of the engine system, such as the sensors described above with reference to FIG. 2. The controller may employ fuel system and evaporative emissions system actuators, such as canister purge valve (e.g., 261), fuel tank isolation valve (e.g., 252), vessel valve (e.g., 298), ELCM (e.g., 295), etc., according to the method below.

Method 500 begins at 505 and includes evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Continuing at 510, method 500 may include indicating whether conditions are met for pressurization of the onboard pressure vessel. For example, conditions for vessel pressurization may include a vehicle in operation, where the vehicle may be powered via battery power, power from an internal combustion engine, or both. In some examples, the conditions for vessel pressurization may additionally include a condition where the vehicle is not in operation, but where the PCM is kept alive to pressurize the onboard vessel during key-off conditions. In other examples, conditions for vessel pressurization may additionally or alternatively include an indication that a canister purge event is not in progress, an indication that a refueling event is not in progress, a predetermined amount of time since a prior vessel pressurization event, an indication that pressure in the pressure vessel is below a predetermined pressure threshold, an absence of an indication of undesired evaporative emissions in the evaporative emissions control system (e.g., 251) and pressure vessel, an indication that a FTIV (e.g., 252) and CPV (e.g., 261) are functional, and an absence of any other conditions that would negatively impact vessel pressurization. If, at 510, vessel pressurization conditions are not met, method 500 may proceed to 512 and may include maintaining current vehicle operating conditions. For example, if the vehicle is in the process of conducting a fuel vapor canister purging operation, the purging operation may be continued. Similarly, if the vehicle is in the process of an evaporative emissions test diagnostic that does not include pressurization of the onboard pressure vessel, the evaporative emissions test diagnostic may be continued. In other examples, responsive to conditions not being met for vessel pressurization, fuel system and evaporative emissions system actuators such as the CPV, FTIV, vessel valve (VV), ELCM, etc., may be maintained in their current status. Method 500 may then end.

Returning to 510, if it is indicated that conditions are met for vessel pressurization, method 500 may proceed to 515. At 515, method 500 may include performing an ELCM reference check. As discussed herein with regards to FIG. 3A, an ELCM reference check may comprise placing a COV in a first position and activating an ELCM pump. A pressure sensor (e.g., 335) may record the resulting pressure level in the ELCM after a predetermined amount of time, or when the pressure level has reached a plateau. The recorded pressure level at the end of the reference check may be used as a pressure threshold to signify the expected pressure attainable for an evaporative emissions system and pressure vessel.

Subsequent to performing the ELCM reference check, method 500 may proceed to 520. At 520, method 500 may include commanding closed or maintaining closed the CPV (e.g., 261), commanding closed or maintaining closed the FTIV (e.g., 252), commanding open the VV (e.g. 298), and commanding the ELCM pump to pressurize the evaporative emissions control system (e.g., 251) and onboard pressure vessel (e.g., 297). For example pressurizing the evaporative emissions control system and pressure vessel may comprise configuring the ELCM COV in the second position, as discussed above with regard to FIG. 3B, and activating the pump (e.g., 335) by running a pump circuit (e.g., 400) in a first direction, as described above with regard to FIG. 4A.

With the ELCM pump activated to pressurize the evaporative emissions system and pressure vessel, method 500 may proceed to 525. At 525, method 500 may include indicating whether pressure in the evaporative emissions control system has reached a predetermined pressure threshold. For example, the predetermined pressure threshold may be based on the pressure level attained during the reference check at 510. In some examples, the predetermined pressure threshold may be greater than the pressure level attained during the reference check, by a predetermined amount. Pressure in the evaporative emissions control system may in some examples be monitored by ELCM pressure sensor (e.g., 296), integral to the ELCM, or may in other examples be monitored by a pressure sensor (e.g., 294) in the vent line, or via a vessel pressure sensor (e.g., 293).

If, at 525 it is indicated that pressure in the evaporative emissions system and pressure vessel has not reached the predetermined pressure threshold, method 500 may proceed to 530. At 530, method 500 may include indicating whether pressure in the evaporative emissions system and pressure vessel has reached a plateau without reaching the predetermined pressure threshold. If, at 530, a pressure plateau is not indicated, method 500 may continue to pressurize the evaporative emissions system and pressure vessel by maintaining the ELCM pump activated, CPV and FTIV closed, and VV opened. Alternatively, if, at 530 it is indicated that a pressure plateau has been reached prior to the predetermined pressure threshold being reached, method 500 may proceed to 535.

At 535, method 500 may include commanding closed the VV. By commanding closed the VV, method 500 may include isolating the evaporative emissions control system from the pressure vessel. With the evaporative emissions control system isolated from the pressure vessel, method 500 may continue to apply pressure on the evaporative emissions control system by maintaining activated the ELCM pump in pressure mode. Proceeding to 540, method 500 may include indicating whether pressure in the evaporative emissions control system reaches the predetermined pressure threshold. If, at 540, the predetermined pressure threshold is not reached while the evaporative emissions control system is isolated from the pressure vessel, method 500 may proceed to 545 and may include indicating undesired evaporative emissions in the evaporative emissions control system. Indicating undesired evaporative emissions in the evaporative emissions control system may include recording the negative result at the controller. However, while it may be indicated that undesired evaporative emissions are present in the evaporative emissions control system, an indication of whether undesired evaporative emissions are also present in the pressure vessel may not be possible. In one example, if the pressure vessel is configured with a pressure sensor (e.g., 293), the integrity of the pressure vessel may additionally be indicated. Alternatively, if the pressure vessel does not contain a pressure sensor, the integrity of the pressure vessel may not be indicated. Whether the integrity of the pressure vessel may be indicated or not, parameters for refueling may be updated as described in further detail below.

Proceeding to 550, method 500 includes deactivating the ELCM pump. Continuing to 555, method 500 includes depressurizing the evaporative emission control system. For example, ELCM COV may be configured in the first position with the pump off, thus coupling the evaporative emissions system to atmosphere, as described above with regard to FIG. 3C. As such, pressure in the evaporative emissions control system may be returned to atmospheric pressure. In some examples, the VV may additionally be commanded open to depressurize the pressure vessel, and responsive to an indication that pressure in the evaporative emissions control system and pressure vessel has reached atmospheric pressure, commanding closed the VV. For example, because undesired evaporative emissions are indicated in the evaporative emissions system, even if the integrity of the pressure vessel is not compromised, it may be undesirable to attempt to route pressure from the pressure vessel to the fuel tank during a refueling event, as the undesired evaporative emissions in the evaporative emissions system may result in an inability to sufficiently pressurize the fuel tank.

Continuing to 560, method 500 includes updating refueling parameters. For example, as undesired evaporative emissions were indicated in the evaporative emissions control system, the pressure vessel may not be relied upon for stopping a refueling dispenser during a refueling event. As such, at 560, updating refueling parameters may include updating the controller to stop actively pressurizing the pressure vessel, and responsive to a refueling event where a predetermined fuel fill level is reached, not commanding open the VV to apply pressure to the fuel tank. For example, the vehicle may be equipped with a FLVV, as described above, which may serve as a secondary mechanism to automatically stop the refueling dispenser pump in the absence of the pressure vessel. In some examples, the FLVV may be calibrated to respond to a fuel fill level greater than a fuel fill level threshold for pressurizing the fuel tank via the pressure vessel. In still other examples, an FLVV may not be relied upon, but instead the controller may close the FTIV responsive to a fuel fill level reaching a threshold under conditions where the pressure vessel may not be relied upon. By closing the FTIV, pressure may build in the fuel tank during refueling, thus inducing an automatic shutoff of the refueling dispenser. In such an example, the FTIV may be maintained closed until it is indicated that the refueling event is complete, for example by an indication that the refueling dispenser has been removed from a fuel filler neck, a refueling cap has been replaced, fuel level has stabilized, etc. After it is indicated the refueling event is complete, the FTIV may again be commanded open to relieve pressure in the fuel tank, and then commanded closed to seal the fuel tank. Similarly, if relying on an FLVV to automatically shut off the refueling dispenser, subsequent to an indication that the refueling event is complete, the FTIV may be commanded closed.

Continuing to 565, method 500 may include updating evaporative emissions system parameters. For example, diagnostic tests for undesired evaporative emissions on the evaporative emissions control system may be suspended until it is indicated that the source of undesired evaporative emissions has been mitigated. In other examples, a canister purging schedule may be updated to more frequently perform purging operations in order to reduce the amount of vapors that may escape to the atmosphere via the source of undesired evaporative emissions. Method 500 may then end.

Returning to 540, if it is indicated that pressure in the evaporative emissions control system reached the predetermined pressure threshold subsequent to closing the VV and maintaining activated the ELCM pump in pressure mode, method 500 may proceed to 570. At 570, method 500 may include indicating undesired emissions in the pressure vessel, and an absence of undesired emissions in the evaporative emissions control system. In other words, an undesirable amount of air is indicated to be escaping from the pressure vessel during pressurization, and thus the pressure vessel may not be relied upon to stop a refueling dispenser during a refueling event. Accordingly, method 500 may proceed to 550, and may include deactivating the ELCM pump. Continuing to 555, method 500 includes depressurizing the evaporative emission control system. As described above, ELCM COV may be configured in the first position with the pump off, thus coupling the evaporative emissions system to atmosphere, as described above with regard to FIG. 3C. As such, pressure in the evaporative emissions control system may be returned to atmospheric pressure. In some examples, the VV may additionally be commanded open to depressurize the pressure vessel, and responsive to an indication that pressure in the evaporative emissions control system and pressure vessel has reached atmospheric pressure, commanding closed the VV. However, as there is a source of undesired emissions in the pressure vessel, in some examples the VV may be maintained closed as pressure will naturally reach atmospheric pressure via the source of undesired emissions.

Continuing to 560, method 500 includes updating refueling parameters. As described above, as undesired evaporative emissions are indicated in the pressure vessel, at 560 updating refueling parameters may include updating the controller to stop actively pressurizing the pressure vessel, and responsive to a refueling event where a predetermined fuel fill level is reached, not commanding open the VV to apply pressure to the fuel tank. To prevent fuel tank overfilling, the vehicle may be equipped with a FLVV, or an FTIV, as described above, which may serve as secondary mechanisms to automatically stop the refueling dispenser pump in the absence of the pressure vessel according to the methodologies described above.

Continuing to 565, method 500 may include updating evaporative emissions system parameters. For example, diagnostic tests for undesired evaporative emissions on the evaporative emissions control system may be continued with the VV closed until it is indicated that the source of undesired evaporative emissions in the pressure vessel has been mitigated. Method 500 may then end.

Returning to 525, if during pressurizing the evaporative emissions control system and pressure vessel, the predetermined pressure threshold is reached, method 500 may proceed to 580. At 580, method 500 may include indicating an absence of undesired evaporative emissions in the evaporative emissions control system and the pressure vessel. In some examples, indicating the absence of undesired emissions may include storing the passing result at the controller. Proceeding to 585, method 500 may include closing the VV to seal the pressure vessel from the evaporative emissions control system. With the pressure vessel sealed from the evaporative emissions control system, method 500 may proceed to 585, and may include deactivating the ELCM pump and depressurizing the evaporative emissions control system. For example, as described above, depressurizing the evaporative emissions control system may include configuring the ELCM COV in the first position, with the pump off, to couple the evaporative emissions control system to atmosphere, as depicted in FIG. 3C.

Proceeding to 590, method 500 may include indicating whether a refueling event is requested. For example, a refueling request may comprise a vehicle operator depression of a refueling button on a vehicle instrument panel in the vehicle (e.g., refueling button 197), or at a refueling door. In some examples, a refueling request may comprise a refueling operator requesting access to a fuel filler neck, for example, by attempting to open a refueling door, and/or attempting to remove a gas cap. If a refueling event has not been requested, method 500 may proceed to 595 and may include maintaining evap system parameters. For example, as the pressure vessel was previously pressurized, the VV may be maintained closed to maintain the stored pressure in the pressure vessel. Furthermore, the FTIV may be maintained closed to sequester fuel tank vapors to the fuel tank. At 595, method 500 may enable purging operations, and evaporative emissions test diagnostic procedures as usual, provided that the VV is maintained closed. Furthermore, during vehicle-off conditions, the VV may be maintained closed to maintain pressure in the pressure vessel, however if it is subsequently indicated that pressure in the pressure vessel is below a predetermined pressure vessel threshold, pressure in the pressure vessel may need to be replenished. Method 500 may then end.

Returning to 590, if it is indicated that a refueling event is requested, method 500 may proceed to FIG. 6, where stored pressure in the pressure vessel may be used to pressurize the fuel tank responsive to a fuel fill level reaching a fuel fill level threshold, according to the method depicted therein.

Turning now to FIG. 6, a flow chart for a high level example method 600 for performing a refueling event, is shown. More specifically, method 600 may continue from FIG. 5 and may be used to conduct a refueling event wherein, responsive to a fuel fill level reaching a predetermined fuel fill level, the fuel tank may be pressurized via an onboard pressure vessel in order to rapidly shut off a refueling dispenser pump. In this way, reliance on a mechanical fill limit vent valve (FLVV) may be reduced, and overfilling of the fuel tank may be prevented. Method 600 will be described with reference to the systems described herein and shown in FIGS. 1-4B, though it should be understood that similar methods may be applied to other systems without departing from the scope of this disclosure. Method 600 may be carried out by a controller, such as controller 212 in FIG. 2, and may be stored at the controller as executable instructions in non-transitory memory. Instructions for carrying out method 600 and the rest of the methods included herein may be executed by the controller based on instructions stored on a memory of the controller and in conjunction with signals received from sensors of the engine system, such as the sensors described above with reference to FIG. 2. The controller may employ fuel system and evaporative emissions system actuators, such as such as canister purge valve (e.g., 261), fuel tank isolation valve (e.g., 252), vessel valve (e.g., 298), ELCM (e.g., 295), etc., according to the method below.

Method 600 begins at 605 and may include depressurizing the fuel tank responsive to a request for refueling. For example, the controller 212 may open a fuel tank isolation valve (such as FTIV 252) and open or maintain open a vent path between the fuel vapor canister and atmosphere (e.g., open CVV and/or ELCM changeover valve in a first venting position), while maintaining a canister purge valve (e.g., CPV 261) closed, to depressurize the fuel tank before allowing enabling fuel to be added therein. The fuel tank isolation valve may be opened in a manner to depressurize the fuel tank at a predetermined rate, so as to prevent rapid depressurization which may cause damage to fuel system components (e.g., FLVV if included, and GVV, which may cork shut due to rapid depressurization). A refueling lock, (such as refueling lock 245), may be maintained locked until the fuel tank pressure decreases to a threshold pressure (e.g., atmospheric pressure), and then commanded to unlock, thus allowing access to the fuel filler neck only following fuel tank depressurization. The fuel tank isolation valve and canister vent path may be maintained open for the duration of the refueling event, to allow refueling vapors to be flowed to the fuel vapor canister, and to allow gasses stripped of refueling vapors to be flowed to atmosphere.

Continuing at 610, method 600 includes monitoring fuel level via a fuel tank fill level sensor and fuel tank pressure (FTP) via a fuel tank pressure sensor for the duration of the refueling event. Monitoring FTP may include receiving signals from one or more fuel tank pressure sensors continuously, or at predetermined time intervals such that a predetermined number of fuel tank pressure measurements can be performed over the duration of the refueling event. The predetermined number of fuel tank pressure measurements and the predetermined time intervals may be set depending on a noise characteristic of the sensor and/or fuel tank pressure signal, for example. In one example, the predetermined time interval may be 5 seconds or 10 seconds, or frequent enough to collect a reliable number of pressure measurements representative of the FTP dynamics typically observed during refueling. As another example, the predetermined time interval or predetermined number of fuel tank pressure measurements may be set large enough to reliably measure a rate of change in fuel tank pressure due to a refueling event. Similarly, monitoring fuel level may include the control system receiving information regarding the level of fuel stored in the fuel tank via one or more fuel level sensors, either continuously or at predetermined intervals over the duration of the refueling event.

Proceeding to 615, method 600 includes indicating whether the fuel tank is full. In one example, a full fuel tank may comprise a fuel level at 100% capacity of the fuel tank. In other examples, the predetermined fuel fill level threshold may be set by a vehicle operator via, for example, an onboard human machine interface (HMI). In some examples, a full fuel tank may comprise a predetermined fuel fill level threshold that comprises a level of fuel below a level of fuel that may result in a FLVV closing, by a predetermined amount. If, at 615 it is indicated that the fuel tank is not full, method 600 may proceed to 620 and may include indicating whether the refueling event is complete. For example, completion of refueling at 620 may be indicated when the fuel level has plateaued for a predetermined duration of time. Indicating whether the refueling event is complete may further include an indication that a refueling nozzle has been removed from the fuel filler neck, replacement of a fuel cap, closing of a refueling door, etc. If, at 620 it is indicated that refueling is not complete, method 600 may continue monitoring the fuel level and fuel tank pressure during the refueling event. Alternatively, if at 620 it is indicated that refueling is complete yet the predetermined fuel fill level threshold was not reached, method 600 may proceed to 625 and may include closing the FTIV. Proceeding to 630, method 600 may include updating vehicle operating conditions to reflect the recent refueling event. For example, a loading state of a fuel vapor canister may be updated responsive to the refueling event, and a fuel fill level may be updated to reflect the level of fuel in the tank. In some examples, a canister purge schedule may be updated responsive to the loading state of the fuel vapor canister. For example, as the predetermined fuel fill level was not reached, the canister purge schedule may be updated to delay canister purging, based on the canister loading state and vehicle operating conditions. Furthermore, as the predetermined fuel fill level was not reached, and pressure from the pressure vessel was not applied to the fuel tank to induce an automatic shutoff of the refueling dispenser, the VV (e.g., 298) may be maintained closed to continue storing pressure in the pressure vessel for subsequent refueling events.

Returning to 615, if it is indicated that the fuel tank is full, method 600 may proceed to 635. At 635, method 600 may include commanding open the VV and activating the ELCM pump in pressure mode to selectively couple the pressure vessel to the fuel tank. With the FTIV open and the CPV closed during refueling, by commanding open the VV a pressure wave may be directed to the fuel tank from the evaporative emissions system in order to rapidly pressurize the fuel tank to induce an automatic shutoff of the refueling dispenser pump. In some examples, the amount of pressure in the fuel tank that may induce an automatic shutoff of the refueling dispenser pump may be 10 InH2O. To direct pressure from the pressure vessel to the fuel tank, the ELCM pump may be activated in pressure mode to further pressurize the fuel system and evaporative emissions system. For example, as described above, activating the ELCM pump in pressure mode may comprise configuring the ELCM COV in the second position, as discussed above with regard to FIG. 3B, and activating the pump (e.g., 335) by running a pump circuit (e.g., 400) in a first direction, as described above with regard to FIG. 4A. Activating the ELCM pump in pressure mode may serve to prevent pressure from the pressure vessel escaping to atmosphere, and may further serve to re-pressurize the pressure vessel to a predetermined pressure level threshold while the VV is commanded open. As such, pressure in the pressure vessel may be replenished while the VV is commanded open. However, in other examples, rather than commanding on the ELCM pump in pressure mode while the VV is commanded open to pressurize the fuel tank, the ELCM COV may be configured in a closed conformation to seal the vent line (e.g., 227) from atmosphere. If included, a canister vent valve may additionally or alternatively be commanded closed to seal the vent line from atmosphere.

Proceeding to 640, following commanding open the VV to pressurize the fuel tank, canister temperature may be monitored in order to determine whether a canister temperature decrease greater than a threshold canister temperature decrease is indicated. For example, canister temperature may be monitored by a canister temperature sensor (e.g., 232). Commanding open the VV, and in some examples activating the ELCM pump in pressure mode, may force air through the fuel vapor canister to the fuel tank, as described above. By routing air through the fuel vapor canister, hydrocarbons adsorbed in the fuel vapor canister may be desorbed, and may be directed to the fuel tank. As the process of hydrocarbon desorption is endothermic, as hydrocarbons are desorbed from the fuel vapor canister, temperature may decrease in the vicinity of the desorbed hydrocarbons. Positioning a temperature sensor near a load port (e.g., 202) of the fuel vapor canister and monitoring temperature while the VV is commanded open may thus indicate when the fuel vapor canister is free of hydrocarbons. For example, a temperature decrease greater than a threshold temperature decrease may indicate that hydrocarbons are being desorbed in the vicinity of the load port, thus indicating that the rest of the fuel vapor canister is free of hydrocarbons. As such, at 640, method 600 includes indicating whether fuel vapor canister temperature decrease is greater than a threshold. If, at 640, a canister temperature decrease greater than a threshold is indicated, method 600 proceeds to 645 and includes closing the VV, and if activated, deactivating the ELCM pump. By way of an example, a refueling event in which the fuel tank was nearly full and is re-filled to capacity may not result in significant loading of the fuel vapor canister, such that when the VV is opened, and in some examples when the pump is additionally activated, the fuel vapor canister may be indicated to be free of hydrocarbons. Closing the VV and in some examples stopping the ELCM pump when a temperature decrease greater than a threshold is indicated ensures that air free of hydrocarbons is not pushed into the fuel tank. Furthermore, at 645, whether the ELCM pump was activated during the fuel tank pressurization, or if the COV was configured in a closed conformation to seal the vent line from atmosphere, the ELCM COV may be placed in a first conformation to couple the vent line to atmosphere, as depicted in FIG. 3C. Additionally, if a canister vent valve was commanded closed during the fuel tank pressurization, the canister vent valve may be commanded open.

In an example as described above where it is indicated that the canister is free of hydrocarbons during fuel tank pressurization, a FLVV may be relied upon to induce automatic shutoffs of the refueling dispenser subsequent to the VV being commanded closed. As described above, the FLVV may be included in the vehicle as a backup mechanism to prevent fuel tank overfilling in the event that external pressure cannot be applied to the fuel tank to induce an automatic shutoff, as in the case where the fuel vapor canister is free from hydrocarbons. In another example, an FLVV may not be included, but instead the FTIV may be commanded closed responsive to the VV being commanded closed. By commanding closed the FTIV, subsequent addition of fuel to the fuel tank may result in a pressure build that may induce an automatic shutoff of the refueling dispenser pump.

As such, proceeding to 650, method 600 may include updating refueling parameters, and may further include updating a canister purge schedule to reflect that the canister is free (or nearly free) from fuel vapor. In one example, updating refueling parameters may thus comprise not commanding open the VV responsive to subsequent addition of fuel, but instead commanding closed the FTIV, as described above. In other examples, the FTIV may be maintained open and the subsequent addition of fuel may be prevented via the backup FLVV. As the canister was indicated to be free, or nearly free, of fuel vapor, updating the canister purge schedule may include delaying a scheduled fuel vapor canister purging operation responsive to the canister loading state. Method 600 may then end.

Returning to 640, if a canister temperature decrease greater than the threshold is not indicated, method 600 may proceed to 655. At 655, method 600 may include indicating whether the refueling dispenser pump was shutoff as a result of pressurizing the fuel tank via pressure from the pressure vessel. In one example, fuel tank pressure may be monitored, and if there is an abrupt decrease in fuel tank pressure as a result of the refueling dispenser pump being shut off, then it may be indicated that the refueling dispenser pump has been automatically shut off. In other examples, fuel level in the tank may additionally or alternatively be monitored, and if fuel level plateaus responsive to the fuel tank being pressurized via the pressure vessel, then it may be indicated that the refueling dispenser has been automatically shut off. Furthermore, it may be indicated that the refueling dispenser has been automatically shut off if it is indicated that pressure in the fuel tank has reached a first predetermined fuel tank pressure threshold (prior to an indication of a pressure drop due to the refueling dispenser pump being deactivated). For example, the first predetermined fuel tank pressure threshold may be a pressure level that induces an automatic shutoff of the refueling dispenser pump. As described above, in one example, the first predetermined fuel tank pressure threshold may comprise 10 In H2O, however other examples may include different fuel tank pressure thresholds without departing from the scope of the present disclosure.

If, at 655 it is indicated that the refueling dispenser pump has been shut off, method 600 may proceed to 660. At 660, method 600 may include commanding closed the VV and stopping the ELCM pump to uncouple the pressure vessel from the fuel tank. For example, the ELCM pump may be deactivated and the COV may be configured in the first position, as described above with regard to FIG. 3C. Proceeding to 665, method 600 may include monitoring the fuel system for the subsequent addition of fuel to the fuel tank following an automatic shutoff of the refueling dispenser. In other words, the fuel system may be monitored to indicate whether a vehicle operator attempts to trickle-fill the fuel tank. In one example, a trickle-fill attempt may be indicated by an increase in pressure in the fuel tank responsive to the further addition of fuel to the fuel tank. For example, if the VV is commanded closed and the ECLM pump is deactivated and the vent line is coupled to atmosphere responsive to an automatic refueling dispenser pump shutoff, pressure in the fuel tank may begin to return to atmospheric pressure. However, if during the return to atmospheric pressure, a subsequent pressure rise is indicated, it may be indicated that additional fuel is being added to the fuel tank. In another example, at 665 subsequent addition of fuel to the fuel tank may be indicated by the fuel tank fuel level sensor. Accordingly, if it is indicated that a trickle-fill event is in progress at 665, method 600 may include returning to step 635 of method 600, and may include recoupling the pressure vessel to the fuel tank. For example, method 600 may include commanding open the VV and activating the ELCM pump in pressure mode again in order to rapidly induce an automatic shutoff of the refueling dispenser pump. Such a sequence may be repeated as many times as fuel is attempted to be added to the fuel tank. By rapidly and repeatedly inducing automatic shutoffs of the refueling dispenser pump, further attempts to add fuel to the tank may thus be prevented, and may therefore result in preventing fuel tank overfilling.

Returning to 665, if it is indicated that a trickle-fill is not attempted, it may be indicated whether the refueling event is complete. As described above, completion of refueling may be indicated when the fuel level has plateaued for a predetermined duration of time, and may further include an indication that a refueling nozzle has been removed from the fuel filler neck, replacement of a fuel cap, closing of a refueling door, etc. If, at 665 it is indicated that a further trickle-fill event is not occurring, and that refueling is complete, method 600 may proceed to 670. At 670 method 600 may include commanding closed the FTIV responsive to pressure in the fuel tank reaching atmospheric pressure. Continuing to 675, method 600 may include updating vehicle operating conditions. In one example, updating vehicle operating conditions may include updating a canister loading state based on the recent refueling event, and may further include updating a canister purge schedule to reflect the canister loading state. Furthermore, a fuel gauge may be updated based on the refueling event. Method 600 may then end.

Returning to 655, if during pressurizing the fuel tank via the pressure vessel, it is indicated that an automatic shutoff of the refueling dispenser is not induced, method 600 may proceed to 680. At 680, method 600 may include indicating whether pressure in the fuel tank is greater than a second predetermined pressure threshold. For example, under some circumstances pressurizing the fuel tank via the pressure vessel may not induce an automatic shutoff of the refueling dispenser pump, and pressure in the fuel tank may reach a second pressure threshold. As such, if an automatic shutoff of the refueling dispenser pump is not indicated and yet pressure in the fuel tank is not indicated to have reached the second predetermined pressure threshold at 685, method 600 may continue to pressurize the fuel tank via the pressure vessel, by returning to step 635 of method 600. Alternatively, if at 685 it is indicated that pressure in the fuel tank has reached the second predetermined pressure threshold, method 600 may proceed to 690. At 690, method 600 may include commanding closed the VV, and stopping the ELCM pump if the ELCM pump is activated. Furthermore, at 690, method 600 may include commanding the ELCM COV to a first position (and commanding open a canister vent valve, if included), such that the vent line may be coupled to atmosphere, as depicted above with regard to FIG. 3C. As such, pressure in the fuel tank may be relieved. Continuing to 695, method 600 may include re-attempting to shut off the refueling dispenser pump. In such an example, as described above, a backup FLVV may be included in the fuel tank such that if the level of fuel rises to a predetermined level, the FLVV may be closed and the resulting pressure build in the fuel tank may thus induce an automatic shutoff of the refueling dispenser pump. In other examples, as described above, the FTIV may be commanded closed once pressure in the fuel tank has been relieved and responsive to fuel level in the fuel tank reaching a predetermined fuel fill level. In still other examples, subsequent to the pressure being relieved in the fuel tank, the VV may be again commanded open and the ELCM pump activated in pressure mode in an attempt to induce an automatic shutoff of the refueling dispenser pump. Furthermore, at 695, method 600 may include alerting the vehicle operator or refueling dispenser operator of the need to discontinue refueling. For example, alerting the vehicle operator or refueling dispenser operator may include the controller initiating an alert comprising honking of a vehicle horn, a text message being sent to the vehicle operator, an alert on the vehicle dashboard, etc. As such, method 600 may proceed to 655 and may include indicating whether the fuel dispenser has been shut off, and method 600 may continue to proceed as described above with regard to steps 660 to the end of method 600.

FIG. 7 shows an example timeline 700 for pressurizing an onboard pressure vessel that may be used to pressurize a fuel tank responsive to a fuel tank fill level reaching a predetermined fuel fill level threshold using methods described herein and with respect to FIG. 5, and as applied to the systems described herein and with reference to FIGS. 1-4B. Timeline 700 includes plot 705, indicating whether entry conditions are met for pressurizing the onboard pressure vessel. Timeline 700 further includes plot 710, indicating the position of an ELCM changeover valve (COV), and 715, indicating whether the ELCM pump is in an ON, or an OFF state. It should be understood that the ELCM pump may be used in either a pressure mode, or a vacuum mode, however in this example timeline when the ELCM pump is ON, the ELCM pump is operating in pressure mode. Timeline 700 further includes plot 720, indicating the open or closed position of a fuel tank isolation valve (FTIV), plot 725, indicating the open or closed position of a canister purge valve (CPV), and plot 730, indicating the open or closed position of a pressure vessel valve (VV), over time. Timeline 700 further includes plot 735, indicating a pressure in a vehicle evaporative emissions system, the pressure sensor close-coupled to the ELCM pump, over time. Line 736 represents a predetermined pressure threshold indicating that the onboard pressure vessel has been sufficiently pressurized. Timeline 700 further includes plot 740, indicating whether undesired evaporative emissions are indicated in the evaporative emissions system or the onboard pressure vessel, over time.

At time $t_0$ conditions are not indicated to be met for pressurizing the onboard pressure vessel, indicated by plot 705. As described above, conditions for vessel pressurization may include the vehicle in operation where the vehicle may be powered via battery power, power from an internal combustion engine, or both. Some examples may additionally include a condition where the vehicle is not in operation, but where the PCM is kept alive to pressurize the onboard vessel during key-off conditions. Conditions may not be met for pressurization if a canister purge event is in progress, if a refueling event is in progress, if a predetermined amount of time has not elapsed since a prior pressurization event, if pressure in the vessel is not below a predetermined pressure threshold, if undesired evaporative emissions are indicated in the evaporative emissions system or in the pressure vessel, if the FTIV or CPV are not indicated to be functional, etc. As such, ELCM COV is indicated to be in a first position, as depicted above with regard to FIG. 3C, indicated by plot 710. With ELCM COV in the first position, the fuel vapor canister may be coupled to atmosphere via the vent line (e.g., 227). The ELCM pump is not on, indicated by plot 715. The FTIV, indicated by plot 720, the CPV, indicated by plot 725, and the VV, indicated by plot 730, are all closed. With the ELCM COV in the first position, pressure in the evaporative emissions control system is at atmospheric pressure, indicated by plot 735. Finally, no undesired evaporative emissions are indicated, as illustrated by plot 740.

At time $t_1$, conditions for onboard pressure vessel pressurization are indicated to be met. Accordingly, the ELCM pump is turned on, indicated by plot 715, while the ELCM COV remains in the first position, and the FTIV, CPV, and VV remain closed. In this configuration, the ELCM pump pressurizes the internal orifice, allowing a pressure reference to be established for undesired evaporative emissions with an equivalent diameter to the reference orifice, as depicted above with regard to FIG. 3A. As such, pressure in the evaporative emissions control system remains constant, even with the pump on, as indicated by plot 735. In some examples, the reference orifice may be sized such that responsive to an indication that the pressure reference is achieved during subsequent pressurization of the evaporative emissions control system and pressure vessel, the onboard pressure vessel may store a pressure above a threshold level for a predetermined time duration. In some examples, such a time duration may include 6, 12, 24, or 48 hours. However, other examples have been contemplated and the specific duration that the pressure vessel may store pressure above the threshold level may comprise any duration suitable for subsequent pressurization of the fuel tank to induce an automatic shutoff of a refueling dispenser.

At time $t_2$, the pressure reference (predetermined pressure threshold) is set, as denoted by line 736. As such, pressurization of the evaporative emission control system and onboard pressure vessel may begin. Accordingly, the ELCM pump remains on, and the COV is configured in the second position as depicted above with regard to FIG. 3B, via energizing of the ELCM solenoid. Furthermore, at time $t_2$ the VV is commanded open, thus coupling the interior of the pressure vessel to the evaporative emissions control system via the vent line (e.g., 227). The evaporative emissions control system is maintained sealed from engine intake via the CPV in a closed conformation, and maintained sealed from the fuel tank via the FTIV in a closed conformation. As such, the entire evaporative emissions control system, as well as the pressure vessel, are pressurized.

Accordingly, between time $t_2$ and $t_3$ pressure in the evaporative emissions control system and pressure vessel is indicated to rise, illustrated by plot 735. At time $t_3$, pressure in the evaporative emissions control system and pressure vessel reach the predetermined pressure threshold (reference pressure). Upon pressure reaching the predetermined pressure threshold at time $t_3$, the VV may be commanded closed to store pressure in the onboard pressure vessel. Additionally, the ELCM pump may be turned off, and the ELCM COV may be commanded to the first position, thus coupling the evaporative emissions control system to atmosphere via the vent line. As such, pressurization conditions are no longer indicated to be met, as illustrated by plot 705. Furthermore, as the ELCM pump was able to pressurize the evaporative emissions control system and the pressure vessel to the predetermined pressure threshold, an absence of undesired evaporative emissions are indicated, as illustrated by plot 740.

With the onboard pressure vessel pressurized, the ELCM pump turned off, and the ELCM COV configured in the first position, pressure in the evaporative emissions control system may return to atmospheric pressure. Accordingly, between time $t_3$ and $t_4$, pressure in the evaporative emissions system returns to atmospheric pressure, indicated by plot 735.

FIG. 8 shows an example timeline 800 for actively pressurizing a fuel tank during a refueling event responsive to a predetermined fuel fill level threshold being reached, and/or responsive to a trickle-fill event, according to the methods described herein and the regard to FIG. 6, and as applied to the systems described herein and with regard to FIGS. 1-4B. Timeline 800 includes plot 805, indicating whether a refueling event is requested by a vehicle operator, over time. Timeline 800 further includes plot 810, indicating whether an ELCM changeover valve (COV) is in a first position, depicted above with regard to FIG. 3A and FIG. 3C, or in a second position, depicted above with regard to FIG. 3B, over time. Timeline 800 further includes plot 815, indicating the ON or OFF state of an ELCM pump, over time. It should be understood that the ELCM pump may be used in either a pressure mode, or a vacuum mode, however in this example timeline when the ELCM pump is ON, the ELCM pump is operating in pressure mode. Timeline 800 further includes plot 820, indicating an open or closed position of a fuel tank isolation valve (FTIV), and plot 825, indicating an open or closed position of an onboard pressure vessel valve (VV), over time. Timeline 800 further includes plot 830, indicating pressure in a fuel tank as monitored by a fuel tank pressure transducer (FTPT, e.g., 291), over time. Line 831 represents atmospheric pressure, line 832 represents a first predetermined fuel tank pressure threshold, and line 833 represents a predetermined second fuel tank pressure threshold. First fuel tank pressure threshold indicates a fuel tank pressure wherein a refueling dispenser pump may be automatically shut off responsive to pressure in the tank reaching the first fuel tank pressure threshold. Second fuel tank pressure threshold indicates a fuel tank pressure wherein, if reached, pressure in the fuel tank may need to be relieved. Timeline 800 further includes plot 835, indicating a level of fuel in the fuel tank as indicated by a fuel level sensor (e.g., 234), over time. Line 836 represents a predetermined fuel fill level threshold. Timeline 800 further includes plot 840, indicating a fuel flow rate from a refueling dispenser pump into the fuel tank, over time. Timeline 800 further includes plot 845, indicating a canister temperature as monitored by a canister temperature sensor (e.g., 232), over time. Line 846 represents a threshold canister temperature, which, if reached, active pressurization of the fuel tank via the onboard pressure vessel may need to be discontinued, to prevent fresh air from entering the fuel tank.

At time $t_0$, a refueling event is not requested, indicated by plot 805. As described above, a refueling request may comprise a vehicle operator depression of a refueling button on a vehicle instrument panel in the vehicle (e.g., refueling button 197), or at a refueling door. In some examples, a refueling request may comprise a refueling operator requesting access to a fuel filler neck, for example, by attempting to open a refueling door, and/or attempting to remove a gas cap. The ELCM COV is configured in a first position, indicated by plot 810, as depicted above with regard to FIG. 3C. As such, a fuel vapor canister (e.g., 222) is coupled to atmosphere via a vent line (e.g., 227). Additionally, the ELCM pump is off, indicated by plot 815. The FTIV is closed, indicated by plot 820, and the VV is additionally closed, indicated by plot 825. With the FTIV closed, pressure in the fuel tank, indicated by plot 830, is slightly above atmospheric pressure. The fuel tank is nearly empty of fuel, as indicated by plot 835. As the vehicle is not in the process of refueling, no fuel is flowing from a refueling dispenser, indicated by plot 840. Canister temperature is low, as the FTIV is closed and a refueling event is not in progress, indicated by plot 845.

At time $t_1$, a request for refueling is indicated. Accordingly, the FTIV is commanded open and the ELCM COV is maintained in the first position. With the FTIV commanded open and the ELCM COV in the first position, the fuel tank may be depressurized prior to allowing fuel to be added to the tank. As described above, the FTIV may be opened in a manner to depressurize the fuel tank at a predetermined rate, so as to prevent rapid depressurization which may cause damage to fuel system components. A refueling lock, (such as refueling lock 245), may be maintained locked until the fuel tank pressure decreases to a threshold pressure (e.g., atmospheric pressure), and then commanded to unlock, thus allowing access to the fuel filler neck only following fuel tank depressurization. The FTIV and canister vent path may be maintained open for the duration of the refueling event, to allow refueling vapors to be flowed to the fuel vapor canister, and to allow gasses stripped of refueling vapors to be flowed to atmosphere. Accordingly, between time $t_1$ and $t_2$, pressure in the fuel tank, as indicated by plot 830, decreases to atmospheric pressure, represented by line 831.

Following the fuel tank depressurization, at time $t_2$ the refueling event is initiated. Accordingly, fuel is dispensed from the refueling dispenser, as indicated by plot 840. With fuel being dispensed into the tank, between time $t_2$ and $t_3$ fuel level in the tank is indicated to rise, and pressure in the fuel tank is indicated to rise and plateau. Furthermore, as fuel is added to the fuel tank, fuel vapors are routed to the fuel vapor canister, thus resulting in an increase in canister temperature, as measured by the temperature sensor positioned at the load port (close-coupled to the vapor recovery line) of the fuel vapor canister.

At time $t_3$, fuel level in the fuel tank reaches a predetermined fuel fill level threshold, represented by line 836. As described above, in one example the fuel fill level threshold may comprise a fuel level at 100% capacity of the fuel tank. Other examples may include a fuel fill level threshold set by a vehicle operator via an onboard human machine interface (HMI), or a level of fuel below a level of fuel that may result in an FLVV closing (if included), by a predetermined amount. As the predetermined fuel fill level threshold is reached at time $t_3$, the VV is commanded open while maintaining open the FTIV, in order to direct pressure stored in the pressure vessel to the fuel tank. Furthermore, the ELCM COV is commanded to the second position, as depicted in FIG. 3B, and the ELCM pump activated in pressure mode. Accordingly, between time $t_3$ and $t_4$ pressure in the fuel tank rapidly rises, as indicated by plot 830, and at time $t_4$ the first fuel tank pressure threshold is reached, thus pressure in the fuel tank is sufficient to induce an automatic shutoff of the refueling dispenser, as indicated by plot 840.

At time $t_4$, as the refueling dispenser pump was shut off by actively pressurizing the fuel tank, the VV may be commanded closed, the ELCM pump turned off, and the ELCM COV commanded to the first position. With the ELCM COV in the first position, as depicted in FIG. 3C, and with the FTIV open, pressure in the fuel tank may be relieved. Accordingly, between time $t_4$ and $t_5$, pressure in the fuel tank decreases toward atmospheric pressure. However, at time $t_5$, the refueling dispenser pump is activated in an attempt to trickle-fill the fuel tank with additional fuel. Accordingly, pressure in the fuel tank stops declining at time $t_5$ and begins to rise. In order to rapidly prevent the addition of fuel to the fuel tank, the VV is commanded open at time $t_5$, the ELCM pump is commanded on, and the ELCM COV is commanded to the second position. As described above, such a configuration directs pressure to the fuel tank in order to induce an automatic shutoff of the refueling dispenser. Furthermore, by maintaining the ELCM pump activated during the pressurizing of the fuel tank, pressure in the onboard pressure vessel may be replenished.

With the VV commanded open, the FTIV maintained open, and the ELCM pump on with the COV in the second position, between time $t_5$ and $t_6$ pressure in the fuel tank rapidly rises and at time $t_6$ pressure in the fuel tank reaches the first fuel tank pressure threshold. Accordingly, at time $t_6$ an automatic shutoff of the refueling dispenser occurs, indicated by plot 840. As such, the VV is again commanded closed, the ELCM pump turned off, and the ELCM COV configured in the first position.

As described above, with the VV closed, the ELCM pump off and the ELCM COV configured in the first position with the FTIV open, pressure in the fuel tank decreases toward atmospheric pressure between time $t_6$ and $t_7$. However, at time $t_7$ another attempt is made to trickle-fill the fuel tank, as indicated by plot 840. Accordingly, the VV is again commanded open, the ELCM pump commanded on, and the ELCM COV configured in the second position, as described above. As such, pressure in the fuel tank rapidly rises between time $t_7$ and $t_8$, and at time $t_8$ the fuel dispenser is automatically shut off. With the fuel dispenser shut off, the VV is commanded closed, the ELCM pump is turned off, and the ELCM COV is configured in the first position. As described above, in such a configuration, pressure in the fuel tank decreases toward atmospheric pressure. At time $t_9$, atmospheric pressure is reached, and no more instances of trickle-filling are indicated. Furthermore, during actively pressurizing the fuel tank via opening the VV, canister temperature was not indicated to reach the threshold canister temperature as represented by line 846. As such, no air free of fuel vapor was indicated to be introduced into the fuel tank during the time periods of active fuel tank pressurization, and thus the VV was not commanded closed during any active pressurization event as a result of canister temperature decreasing to the threshold canister temperature. Furthermore, in each example condition where the fuel tank was actively pressurized, the introduced pressure into the fuel tank resulted in an automatic shutoff of the refueling dispenser. However, if an automatic shutoff of the refueling dispenser was not indicated, and pressure in the fuel tank were to have risen to the second fuel tank pressure threshold as represented by line 833, the VV would have needed to be commanded closed, the ELCM pump deactivated, and pressure in the fuel tank relieved.

Between time $t_9$ and $t_{10}$, canister temperature continues to decline and stabilize, and pressure in the fuel tank rises slightly as a result of the refueling event and subsequent sealing of the fuel tank by closing the FTIV at time $t_9$.

In this way, fuel tank overfilling may be reduced or prevented. While activated charcoal is a suitable fuel vapor adsorbing material for use in fuel vapor canisters, it may lose its efficiency if coated with liquid fuel. Overfilling of a fuel tank may contribute to such a case where the activated charcoal in the fuel vapor canister becomes coated with liquid fuel. For example, if liquid has entered fuel vapor recovery lines and a fuel vapor canister purge cycle is commanded on at the next engine start, the liquid may be sucked into the canister, thus corrupting the activated carbon.

Typically, fuel limit vent valves (FLVV) are used to prevent fuel tank overfilling, however as the FLVV is a passive mechanical valve, reliability and repeatability between refueling events may vary, and may not prevent extensive trickle-filling of the fuel tank after an initial automatic shutoff of a refueling dispenser. As such, depending on pure mechanical movement reaction times and float devices inside the FLVV to shut off the refueling dispenser pump precisely and repeatedly is not desirable. Another alternative may be to pressurize the fuel tank via an external source, such as an onboard pump. However, a pump may take a significant amount of time to raise pressure in a fuel tank to a level wherein the refueling dispenser may be shut off, thus rendering the use of a pump undesirable as well. By storing pressure in an onboard pressure vessel, a rapid pressure pulse may be delivered without delay to the fuel tank upon fuel level in the fuel tank reaching a fuel fill level threshold. As such, fuel tank overfilling may be prevented, and thus may increase the lifetime of fuel vapor canisters and may reduce evaporative emissions.

The technical effect of preventing fuel tank overfilling via the use of an onboard pressure vessel is to enable rapid pressurization of the fuel tank without delay, such that the operator of a refueling dispenser is unable to add significant amounts of fuel to the fuel tank after a fuel fill level threshold has been attained. As such, the technical effect is to reduce the time constant between an indication to stop the refueling dispenser, and an actual stoppage of the refueling dispenser. As discussed above, with methods such as the use of a mechanical FLVV or an onboard pump, the time constant may be considerably longer than if a pressurized vessel is used to deliver a rapid pressure pulse to the fuel tank. By decreasing the time constant to refueling dispenser shutoff, operators of refueling dispenser pumps are likely to stop attempting further additions of fuel to the fuel tank, as the act of doing so is futile.

In one example, another technical effect of preventing fuel tank overfilling via the use of an onboard pressure vessel is to recognize that the addition of fresh air to the fuel tank is undesirable, and as such, by routing pressurized air through the fuel vapor canister en route to the fuel tank, fuel vapors may be returned to the fuel tank instead of fresh air. By monitoring a canister temperature, the method may be discontinued if it is indicated that fresh air is entering the fuel tank.

The systems described herein and with reference to FIGS. 1-4B, along with the methods described herein and with reference to FIGS. 5-6, may enable one or more systems and one or more methods. In one example, a method comprises storing pressure in a vessel external to a fuel tank that supplies fuel to a vehicle engine; and selectively coupling the vessel to the fuel tank to pressurize the fuel tank to a predetermined pressure threshold responsive to an indication that a fuel level in the fuel tank has reached a predetermined fuel fill level during a refueling event. In a first example of the method, the method further includes wherein the predetermined pressure threshold induces an automatic shutoff of a refueling dispenser, the refueling dispenser supplying fuel to the fuel tank during the refueling event. A second example of the method optionally includes the first example and further includes wherein the stored pressure in the vessel is atmospheric air, the atmospheric air supplied to the vessel via an onboard pump means. A third example of the method optionally includes any one or more or each of the first and second examples and further comprises capturing and storing fuel tank vapors in a fuel vapor canister coupled to the fuel tank; and wherein coupling the vessel to the fuel tank to pressurize the fuel tank further couples the vessel to the fuel vapor canister. A fourth example of the method optionally includes any one or more or each of the first through third examples and further comprises desorbing fuel tank vapors from the fuel vapor canister during coupling the vessel to the fuel tank to pressurize the fuel tank; and wherein pressurizing the fuel tank routes the desorbed fuel vapors to the fuel tank. A fifth example of the method optionally includes any one or more or each of the first through fourth examples and further comprises uncoupling the vessel from the fuel tank responsive to pressure in the fuel tank reaching the predetermined pressure threshold. A sixth example of the method optionally includes any one or more or each of the first through fifth examples and further includes wherein uncoupling the vessel from the fuel tank further comprises: indicating a decrease in fuel tank pressure subsequent to the fuel tank reaching the predetermined pressure threshold. A seventh example of the method optionally includes any one or more or each of the first through sixth examples and further comprises recoupling the vessel to the fuel tank to pressurize the fuel tank to the predetermined pressure threshold responsive to an indication of fuel being added to the fuel tank subsequent to the predetermined fuel fill level being reached. An eighth example of the method optionally includes any one or more or each of the first through seventh examples and further includes wherein the indication of fuel being added to the tank subsequent to the predetermined fuel fill level being reached comprises a fuel tank pressure increase. A ninth example of the method optionally includes any one or more or each of the first through eighth examples and further includes wherein coupling the vessel to the fuel tank to pressurize the fuel tank to a predetermined pressure threshold reduces a time constant between an indication to pressurize the fuel tank, and when the fuel tank pressure reaches the predetermined pressure threshold as compared to other means such as a fill limit vent valve designed to close and seal the fuel tank responsive to fuel level reaching the predetermined fuel fill level.

An example of a system for a vehicle comprises a fuel tank in a vehicle fuel system coupled to a fuel vapor canister in a vehicle evaporative emissions control system via a vapor recovery line; a fuel tank isolation valve positioned in the vapor recovery line between the fuel tank and the fuel vapor canister; an onboard pump positioned in a vent line between the fuel vapor canister and atmosphere, the onboard pump a component of an evaporative level check monitor (ELCM) and wherein the ELCM additionally includes a changeover valve (COV) configurable in a first position and a second position; a pressure vessel coupled to the vent line via a vessel line between the onboard pump and the fuel vapor canister; a vessel valve positioned in the vessel conduit between the pressure vessel and the vent line; a canister purge valve positioned in a purge line between the fuel vapor canister and an intake manifold of a vehicle engine; an evaporative emissions control system pressure sensor; and a controller, storing instructions in non-transitory memory, that when executed, cause the controller to: command or maintain closed the fuel tank isolation valve and the canister purge valve; command open the vessel valve; configure the COV in the second position and activate the onboard pump to pressurize the evaporative emissions control system and pressure vessel; command closed the vessel valve responsive to pressure in the evaporative emissions control system reaching a predetermined pressure threshold to store the pressure; and control the vessel valve responsive to a fuel tank refueling event. In a first example, the system further includes wherein the controller further stores instructions in non-transitory memory, that when executed, cause the controller to: indicate an absence of undesired evaporative emissions in the evaporative emissions system and pressure vessel responsive to pressure in the evaporative emissions control system reaching the predetermined pressure threshold during pressurizing the evaporative emissions control system and pressure vessel. A second example of the system optionally includes the first example and further comprises a fuel level sensor; a fuel tank pressure sensor; and wherein the controller is further configured with instructions stored in non-transitory memory, that when executed cause the controller to: responsive to a request for refueling, command open the fuel tank isolation valve, command the COV in the ELCM to the first position to couple the fuel vapor canister to atmosphere via the vent line, command or maintain closed the canister purge valve; and responsive to an indication that a fuel fill level in the fuel tank has reached a predetermined fuel fill level during refueling: command open the vessel valve, configure the COV in the second position and activate the onboard pump to pressurize the evaporative emissions system and fuel system; and responsive to an indication that pressure in the fuel tank has reached a first predetermined fuel tank pressure threshold, where the first predetermined fuel tank pressure threshold comprises a pressure sufficient to induce an automatic shutoff of a refueling dispenser pump: command closed the vessel valve, deactivate the onboard pump, and configure the ELCM COV in the first position to couple the fuel tank and fuel vapor canister to atmosphere. A third example of the system optionally includes any one or more or each of the first and second examples and further includes wherein the controller further stores instructions in non-transitory memory, that when executed, cause the controller to: monitor fuel tank pressure subsequent to pressure in the tank reaching the first predetermined threshold and responsive to the vessel valve being commanded closed and the onboard pump being deactivated; and responsive to a subsequent pressure increase in the fuel tank and/or an indication of fuel level increasing: pressurize the fuel tank by again commanding open the vessel valve, configuring the ELCM COV in the second position, and activating the onboard pump until the first predetermined fuel tank pressure threshold is reached, and then command closed the vessel valve, deactivate the onboard pump, and configure the ELCM COV in the first position; where the subsequent pressure increase may occur any number of times. A fourth example of the system optionally includes any one or more or each of the first through third examples and further comprises a temperature sensor positioned in the fuel vapor canister close-coupled to the vapor recovery line; and wherein the controller is further configured with instructions stored in non-transitory memory, that when executed cause the controller to: responsive to a temperature decrease greater than a predetermined threshold temperature decrease during pressurizing the fuel tank: command closed the vessel valve, configure the ELCM COV in the first position, deactivate the onboard pump; and command closed the fuel tank isolation valve to increase pressure in the fuel tank to the first predetermined fuel tank pressure threshold. A fifth example of the system optionally includes any one or more or each of the first through fourth examples and further includes wherein the controller is further configured with instructions stored in non-transitory memory, that when executed cause the controller to: responsive to an indication of the presence of undesired evaporative emissions in the evaporative emissions system and/or the pressure vessel during pressurizing the evaporative emissions system and pressure vessel: maintain the vessel valve closed, the onboard pump off, and the ELCM COV in the first position responsive to an indication that the fuel fill level in the fuel tank has reached the predetermined fuel fill level during refueling; and command closed the fuel tank isolation valve to increase pressure in the fuel tank to the first predetermined fuel tank pressure threshold.

Another example of a method comprises inducing an automatic shutoff of a refueling dispenser that supplies fuel to a vehicle fuel tank during a refueling event by directing a pressure wave from an evaporative emissions control system of the vehicle to the fuel tank responsive to a fuel fill level in the fuel tank reaching a predetermined fuel fill level; where the automatic shutoff is induced via pressure in the fuel tank reaching a predetermined fuel tank pressure threshold. In a first example of the method, the method further includes wherein the fuel vapors are stored in a vapor canister positioned in the evaporative control system, and the pressure wave passes through the canister desorbing vapors stored therein and routing the desorbed vapors into the fuel tank. A second example of the method optionally includes the first example and further includes wherein the pressure wave originates from a pressure vessel, the pressure vessel selectively pressurized with atmospheric air actively pumped into the pressure vessel via an onboard pump positioned in the evaporative emissions system. A third example of the method optionally includes the first and second examples and further includes wherein the pressure wave induces the automatic shutoff of the refueling dispenser with a time constant that is faster than inducing an automatic shutoff via a mechanical or electrical valve configured to close and seal the fuel tank responsive to fuel level reaching the predetermined fuel fill level.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
pressurizing a vessel external to a fuel tank that supplies fuel to a vehicle engine; and
while a fuel level in the fuel tank is increasing during a refueling event, selectively coupling the vessel to the fuel tank to pressurize the fuel tank to a predetermined pressure threshold responsive to an indication that the fuel level in the fuel tank has reached a capacity of the fuel tank, where the pressurizing the fuel tank desorbs fuel vapors stored in a fuel vapor storage canister to the fuel tank.

2. The method of claim 1, wherein the predetermined pressure threshold induces an automatic shutoff of a refueling dispenser, the refueling dispenser supplying fuel to the fuel tank during the refueling event.

3. The method of claim 1, wherein pressurizing the vessel further comprises pressurizing the vessel via pumping atmospheric air to the vessel via an onboard pump means.

4. The method of claim 1, further comprising:
uncoupling the vessel from the fuel tank responsive to pressure in the fuel tank reaching the predetermined pressure threshold.

5. The method of claim 4, wherein uncoupling the vessel from the fuel tank further comprises:
indicating a decrease in fuel tank pressure subsequent to the fuel tank reaching the predetermined pressure threshold.

6. The method of claim 4, further comprising:
recoupling the vessel to the fuel tank to pressurize the fuel tank to the predetermined pressure threshold responsive to an indication of fuel being added to the fuel tank subsequent to the uncoupling the vessel from the fuel tank responsive to the pressure in the fuel tank reaching the predetermined pressure threshold.

7. The method of claim 6, wherein the indication of fuel being added to the fuel tank subsequent to the uncoupling the vessel from the fuel tank comprises a fuel tank pressure increase.

8. The method of claim 2, wherein coupling the vessel to the fuel tank to pressurize the fuel tank to the predetermined pressure threshold prevents trickle-filling of the fuel tank.

9. A system for a vehicle, comprising:
a fuel tank in a vehicle fuel system coupled to a fuel vapor canister in a vehicle evaporative emissions control system via a vapor recovery line;
a fuel tank isolation valve positioned in the vapor recovery line between the fuel tank and the fuel vapor canister;
an onboard pump positioned in a vent line between the fuel vapor canister and atmosphere, the onboard pump a component of an evaporative level check monitor (ELCM) and wherein the ELCM additionally includes a changeover valve (COV) configurable in a first position and a second position;
a pressure vessel coupled to the vent line via a vessel line between the onboard pump and the fuel vapor canister;
a vessel valve positioned in the vessel line between the pressure vessel and the vent line;

a canister purge valve positioned in a purge line between the fuel vapor canister and an intake manifold of a vehicle engine;
an evaporative emissions control system pressure sensor; and
a controller, storing instructions in non-transitory memory that, when executed, cause the controller to:
command or maintain closed the fuel tank isolation valve and the canister purge valve;
command open the vessel valve;
configure the COV in the second position and activate the onboard pump to pressurize the evaporative emissions control system and the pressure vessel;
command closed the vessel valve responsive to a pressure in the evaporative emissions control system reaching a predetermined pressure threshold to store the pressure; and
control the vessel valve responsive to a fuel tank refueling event.

10. The system of claim 9, wherein the controller further stores instructions in non-transitory memory that, when executed, cause the controller to:
indicate an absence of undesired evaporative emissions in the evaporative emissions control system and the pressure vessel responsive to the pressure in the evaporative emissions control system reaching the predetermined pressure threshold during pressurizing the evaporative emissions control system and the pressure vessel.

11. The system of claim 10, further comprising:
a fuel level sensor; and
a fuel tank pressure sensor;
wherein the controller is further configured with instructions stored in non-transitory memory that, when executed, cause the controller to:
responsive to a request for refueling, command open the fuel tank isolation valve, command the COV in the ELCM to the first position to couple the fuel vapor canister to atmosphere via the vent line, and command or maintain closed the canister purge valve;
responsive to an indication that a fuel fill level in the fuel tank has reached a predetermined fuel fill level during refueling, command open the vessel valve, configure the COV in the second position, and activate the onboard pump to pressurize the evaporative emissions control system and the vehicle fuel system; and
responsive to an indication that pressure in the fuel tank has reached a first predetermined fuel tank pressure threshold, where the first predetermined fuel tank pressure threshold comprises a pressure sufficient to induce an automatic shutoff of a refueling dispenser pump, command closed the vessel valve, deactivate the onboard pump, and configure the COV in the first position to couple the fuel tank and the fuel vapor canister to atmosphere.

12. The system of claim 11, wherein the controller further stores instructions in non-transitory memory that, when executed, cause the controller to:
monitor fuel tank pressure subsequent to the pressure in the fuel tank reaching the first predetermined fuel tank pressure threshold and responsive to the vessel valve being commanded closed and the onboard pump being deactivated; and
responsive to a subsequent pressure increase in the fuel tank and/or an indication of fuel level increasing:

pressurize the fuel tank by again commanding open the vessel valve, configuring the COV in the second position, and activating the onboard pump until the first predetermined fuel tank pressure threshold is reached, and then command closed the vessel valve, deactivate the onboard pump, and configure the COV in the first position;
where the subsequent pressure increase may occur any number of times.

13. The system of claim 11, further comprising:
a temperature sensor positioned in the fuel vapor canister close-coupled to the vapor recovery line;
wherein the controller is further configured with instructions stored in non-transitory memory that, when executed, cause the controller to:
responsive to a temperature decrease greater than a predetermined threshold temperature decrease during pressurizing the fuel tank:
command closed the vessel valve, configure the COV in the first position, and deactivate the onboard pump; and
command closed the fuel tank isolation valve to increase the pressure in the fuel tank to the first predetermined fuel tank pressure threshold.

14. The system of claim 11, wherein the controller is further configured with instructions stored in non-transitory memory that, when executed, cause the controller to:
responsive to an indication of a presence of undesired evaporative emissions in the evaporative emissions control system and/or the pressure vessel during pressurizing the evaporative emissions system and the pressure vessel:
maintain the vessel valve closed, the onboard pump off, and the COV in the first position responsive to an indication that the fuel fill level in the fuel tank has reached the predetermined fuel fill level during refueling; and
command closed the fuel tank isolation valve to increase the pressure in the fuel tank to the first predetermined fuel tank pressure threshold.

15. A method for a vehicle comprising:
inducing an automatic shutoff of a refueling dispenser during a refueling event where fuel is added to a fuel tank via the refueling dispenser, by directing a pressure wave from an onboard pressure vessel to the fuel tank responsive to a fuel fill level in the fuel tank reaching a predetermined fuel fill level, the onboard pressure vessel selectively coupled via a vessel valve to a vent line that couples a fuel vapor canister to an onboard pump;
where the automatic shutoff is induced via pressure in the fuel tank reaching a predetermined fuel tank pressure threshold under conditions where fuel vapors stored in the fuel vapor canister are being desorbed to the fuel tank via the directing the pressure wave from the onboard pressure vessel to the fuel tank.

16. The method of claim 15, further comprising monitoring a temperature of the fuel vapor storage canister during the directing the pressure wave to the fuel tank; and
commanding closed the vessel valve to discontinue the directing the pressure wave to the fuel tank in response to an indication that the fuel vapor storage canister is free from the stored fuel vapor, the indication based on the temperature of the fuel vapor storage canister during the directing the pressure wave to the fuel tank.

17. The method of claim 15, further comprising selectively pressurizing the pressure vessel via pumping atmospheric air into the pressure vessel via the onboard pump.

18. The method of claim 15, further comprising sealing the vent line from atmosphere to direct the pressure wave from the pressure vessel to the fuel tank.

* * * * *